(12) United States Patent
Väre et al.

(10) Patent No.: US 8,774,225 B2
(45) Date of Patent: Jul. 8, 2014

(54) MAPPING SERVICE COMPONENTS IN A BROADCAST ENVIRONMENT

(75) Inventors: Jani Väre, Kaarina (FI); Jyrki Alamaunu, Turku (FI); Harri J. Pekonen, Raisio (FI); Jussi Vesma, Turku (FI)

(73) Assignee: Nokia Corporation, Espoo (FI)

( * ) Notice: Subject to any disclaimer, the term of this patent is extended or adjusted under 35 U.S.C. 154(b) by 877 days.

(21) Appl. No.: 12/365,394

(22) Filed: Feb. 4, 2009

(65) Prior Publication Data

US 2010/0195633 A1    Aug. 5, 2010

(51) Int. Cl.
H04J 1/00    (2006.01)

(52) U.S. Cl.
USPC ................. 370/486; 725/64; 725/67; 725/68; 725/69; 725/70; 725/71; 725/91; 725/98

(58) Field of Classification Search
USPC ............. 370/338, 486; 725/64, 67–71, 91, 98
See application file for complete search history.

(56) References Cited

U.S. PATENT DOCUMENTS

| | | | |
|---|---|---|---|
| 5,359,601 A | 10/1994 | Wasilewski et al. | |
| 5,425,101 A | 6/1995 | Woo et al. | |
| 5,600,378 A | 2/1997 | Wasilewski | |
| 6,715,099 B1 | 3/2004 | Smith | |
| 2003/0067943 A1 | 4/2003 | Arsenault et al. | |
| 2004/0028131 A1* | 2/2004 | Ye et al. | 375/240.11 |
| 2005/0201321 A1* | 9/2005 | Sinnarajah et al. | 370/328 |
| 2005/0210138 A1 | 9/2005 | Zigmond et al. | |
| 2006/0056346 A1* | 3/2006 | Vadgama et al. | 370/329 |
| 2006/0256865 A1* | 11/2006 | Westerman | 375/240.12 |
| 2007/0160133 A1* | 7/2007 | Bao et al. | 375/240.1 |
| 2007/0230564 A1* | 10/2007 | Chen et al. | 375/240.01 |
| 2008/0225778 A1 | 9/2008 | Vare et al. | |
| 2009/0094356 A1 | 4/2009 | Vare | |

FOREIGN PATENT DOCUMENTS

| | | |
|---|---|---|
| EP | 0508654 A2 | 3/1992 |
| EP | 1592160 A1 | 11/2005 |
| WO | 2008110921 A2 | 9/2008 |
| WO | 2010000928 A1 | 1/2010 |

OTHER PUBLICATIONS

European Broadcasting Union, "Digital Video Broadcasting (DVB); Specification for Service Information (SI) in DVB systems", Draft ETSI EN 300 468 v1.5.2 (Dec. 2003), 99 pages.

(Continued)

*Primary Examiner* — Mark Rinehart
*Assistant Examiner* — Mang Yeung
(74) *Attorney, Agent, or Firm* — Banner & Witcoff, Ltd.

(57) ABSTRACT

Services and service components in a broadcast network may be mapped to disparate physical layer transmission channels (PLPs) using logical layer pipes (LLPs). The use of LLPs allows different service components of a single service to be mapped to physical layer transmission channels (PLPs). Accordingly, service components may be shared among different services. Additionally or alternatively, different functions (e.g., different error detection or correction protocols) may be applied to each service components of a service. A receiver may identify services, service components and corresponding PLPs based on LLP identifiers. The receiver may then access and receive desired services and service components through the identified PLPs.

21 Claims, 23 Drawing Sheets

(56) References Cited

OTHER PUBLICATIONS

European Broadcasting Union, Digital Video Broadcasting (DVB); Frame structure channel coding and modulation for a second generation digital terrestrial television broadcasting system (DVB-T2), Draft ETSI EN 302 755 v1.1.1_0.2 (Oct. 2008), 166 pages.

European Broadcasting Union, "Digital Video Broadcasting (DVB); Specification for Service Information (SI) in DVB systems", ETSI EN 300 468 v1.8.1 (Jul. 2008), 111 pages.

Digital Video Broadcasting, "Frame structure channel coding and modulation for a second generation digital terrestrial television broadcasting system (DVB-T2)", DVB Document A122, Jun. 2008, 158 pages.

International Search Report and Written Opinion mailed May 21, 2010 for Application No. PCT/IB2010/000223, 15 pages.

Russian Application No. 2011136180—Office Action dated Feb. 14, 2013.

* cited by examiner

| Syntax | Number of bits |
|---|---|
| service_association table () { | |
|   table_id | 8 |
|   section_syntax_indicator | 1 |
|   reserved_future_use | 1 |
|   reserved | 2 |
|   section_length | 12 |
|   reserved | 2 |
|   version_number | 5 |
|   current_next_indicator | 1 |
|   section_number | 8 |
|   last_section_number | 8 |
|   reserved_future_use | 6 |
|   identifier_loop_length | 12 |
|   for (j=0;j<N;j++){ | |
|     identifier _type | 8 |
|     number _of_identifiers | 8 |
|     for (j=0;j<N;j++){ | |
|     if (identfier_type == URI) { | |
|       uri _length | 8 |
|       for (j=0;j<uri_length;j++){ | |
|         URI _byte | 8 |
|     } else if (identifier_type== IPv4) { | |
|         IPv 4_src_addr | 32 |
|         IPv 4_dst_addr | 32 |
|     } else if (identifier_type== IPv6) { | |
|         IPv 6_src_addr | 128 |
|         IPv 6_dst_addr | 128 |
|     } else { // identifier_type == private | |
|       private _length | 12 |
|       for (j=0;j<private_length;j++){ | |
|         private _byte | 8 |
|       } | |
|     } | |
|     } | |
|     LLP _ID | 16 |
|   } | |
|   CRC_32 | 32 |
| }     1500 | |

FIG. 15

| Identifier type type | Description |
|---|---|
| GlobalserviceID | 0x01 |
| IPv4 address | 0x02 |
| IPv6 address | 0x03 |
| Service_FragmentID | 0x04 |
| Service Guide fragmentID | 0x05 |
| Access fragmentID | 0x06 |
| The schedule fragmentID | 0x07 |
| The content fragmentID | 0x08 |
| PurchaseData fragmentID | 0x09 |
| Purchase channel fragmentID | 0x0A |
| Reserved_future_use | 0x0B-0xFF |

FIG. 16

| syntax | Number of bits |
|---|---|
| LLP_association_section () { | |
| section_length | 8 |
| for (i=0;i<N;i++) { | |
| LLP_ID | 16 |
| T_INT_LLPF | 16 |
| BS_LLPF | 24 |
| PLP_loop_length | 8 |
| for (i=0;i<N;i++) { | |
| PLP_ID | 16 |
| } | |
| CRC_32 | 32 |
| } | |

FIG. 20

MAPPING SERVICE COMPONENTS IN A BROADCAST ENVIRONMENT

BACKGROUND

Content and other services broadcast in a network may often include many service components. For example, a high definition video may include a standard definition component that provides a base amount of content data and a high definition component that supplements the base content data with high definition information. In current broadcast protocols, such service components are mapped to and carried in a physical layer—according to e.g. the OSI model—through pipes. A physical layer pipe provides a transmission channel through which a sender may transmit data as raw bits to one or more receiving devices. However, current protocols require that all service components of a given service be mapped to the same pipe. Accordingly, components cannot be shared between different services, increasing the resources necessary to broadcast multiple services at once. Additionally, requiring that service components be mapped to the same pipe can inhibit different functions such as error correction or error protection at different strengths from being applied to different components.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One or more aspects relate to a signaling structure for broadcast transmissions in which services or service components thereof are mapped to multiple physical layer transmission channels (PLP) through logical layer pipes. Logical layer pipes (LLP) are associated with either the service or service components or both as well as a set of one or more PLPs to which the service components are mapped. By using LLPs, different services may share service components by associating each LLP, corresponding to each of the different services, with the PLP corresponding to the service component to be shared. Additionally, the use of an LLP allows for different service components of a service to be mapped to different PLPs. Accordingly, for example different error correction or error detection protocols may be applied to the different service components if needed.

According to another aspect, a receiver or subscriber of a broadcast service may discover PLPs through the use of an LLP. For example, a receiver may initially receive a broadcast service signal advertising one or more services. The receiver may then determine services available in the broadcast along with LLPs associated therewith. Upon selection of one of the services or service components, the receiver may discover the PLPs of the service components for the selected service using the LLPs. Once discovered, the PLPs may be used to access the service components of the selected service.

According to yet another aspect, LLPs may be implemented in a signaling layer of a broadcast protocol. The signaling layer may include LLP definition information as well as PLP data.

According to another aspect, LLPs may be implemented in an adaptation layer, which may correspond e.g. to layer 2 of the Open Systems Interconnection (OSI) Reference model. In one example, an LLP may be defined in the adaptation layer and associated with a corresponding service and set of PLPs. In another example, an LLP may be defined in a signaling layer while a mapping component is specified in the adaptation layer. The mapping component is configured to map a service component to the corresponding LLP. Each service component in a service may be linked or otherwise associated to a distinct mapping component. The mapping components may then be associated with a single LLP.

According to yet another aspect, a broadcast system may establish a signaling structure using LLPs to associate services and service components to PLPs. The broadcast system may then broadcast available services to receiving devices along with the LLP and PLP information. The receiving devices may then access services and their associated service components by discovering PLP information through a corresponding LLP.

BRIEF DESCRIPTION OF THE DRAWINGS

Certain embodiments are illustrated by way of example and not limited in the accompanying figures in which like reference numerals indicate similar elements and in which:

FIG. 15 illustrates an example signaling structure for linking a service to an LLP according to one or more aspects described herein.

FIG. 16 illustrates example identifier types according to one or more aspects described herein.

FIG. 20 illustrates a signaling structure for associating PLPs to LLPs according to one or more aspects described herein.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
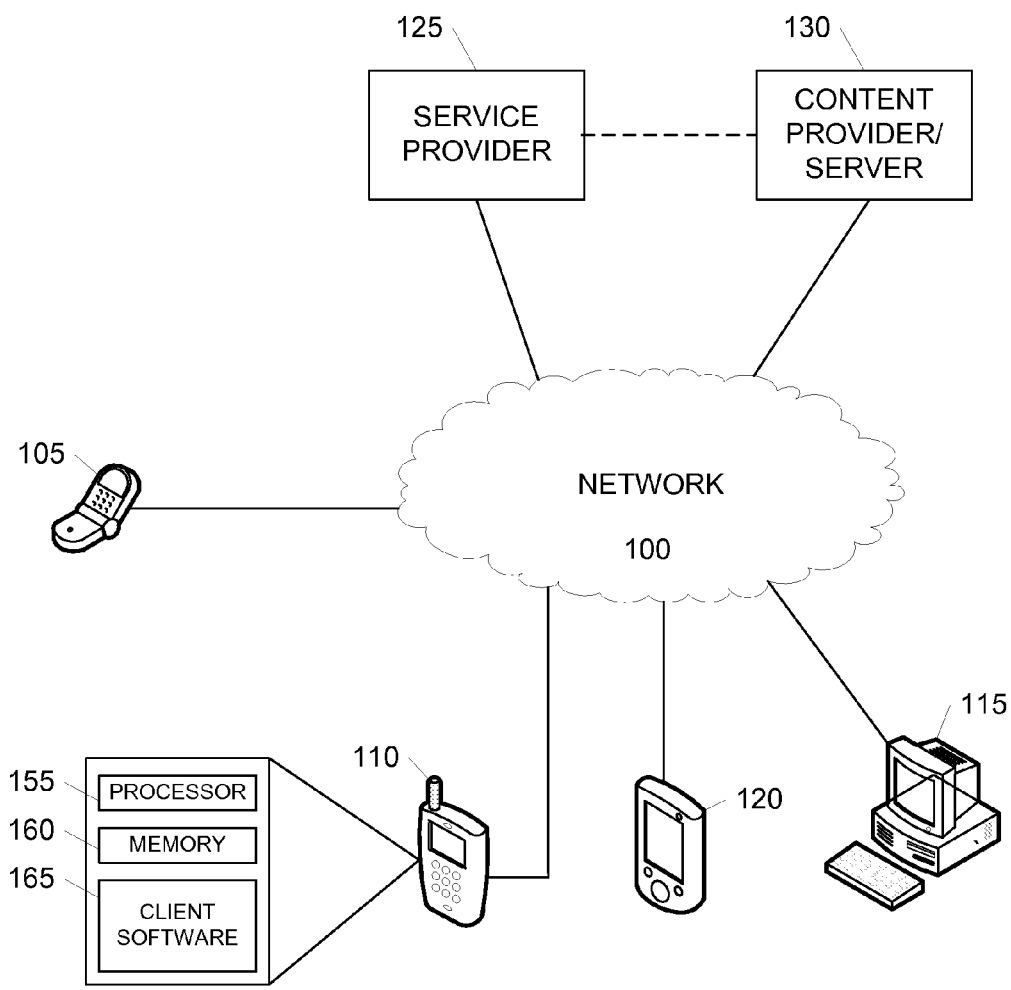
FIG. 1 is a block diagram of an example communication network in which one or more embodiments may be implemented.

FIG. 1 illustrates an example communication network through which various inventive principles may be practiced. A number of computers and devices including mobile communication device 105, mobile phone 110, personal digital assistant (PDA) or mobile computer 120, personal computer (PC) 115, service provider 125 and content provider 130 may communicate with one another and with other devices through network 100. Network 100 may include wired and wireless connections and network elements, and connections over the network may include permanent or temporary connections. Communication through network 100 is not limited to the illustrated devices and may include additional mobile or fixed devices such as a video storage system, an audio/video player, a digital camera/camcorder, a positioning device such as a GPS (Global Positioning System) device or satellite, a television, an audio/video player, a radio broadcasting receiver, a set-top box (STB), a digital video recorder, remote control devices and any combination thereof.

Although shown as a single network in FIG. 1 for simplicity, network 100 may include multiple networks that are interlinked so as to provide internetworked communications. Such networks may include one or more private or public packet-switched networks, e.g. the Internet, one or more private or public circuit-switched networks, e.g. a public switched telephone network, a cellular network configured to facilitate communications to and from mobile communication devices 105 and 110, e.g. through use of base stations, mobile switching centers, etc., a short or medium range wireless communication connection, e.g. Bluetooth®, ultra wideband (UWB), infrared, WiBree, wireless local area network (WLAN) according to one or more versions of Institute of Electrical and Electronics Engineers (IEEE) standard no. 802.11), or a high-speed wireless data network such as Evolution-Data Optimized (EV-DO) networks, Universal Mobile Telecommunications System (UMTS) networks, Long Term Evolution (LTE) networks or Enhanced Data rates for GSM Evolution (EDGE) networks. Devices 105-120 may use various communication protocols such as Internet Protocol (IP), Transmission Control Protocol (TCP), Simple Mail Transfer Protocol (SMTP) among others known in the art. Various messaging services such as Short Messaging Service (SMS) and/or Multimedia Message Service (MMS) may also be included.

Devices 105-120 may be configured to interact with each other or other devices, such as content server 130 or service provider 125. In one example, mobile device 110 may include client software 165 that is configured to coordinate the transmission and reception of information to and from content provider/server 130. In one arrangement, client software 165 may include application or server specific protocols for requesting and receiving content from content server 130. For example, client software 165 may comprise a Web browser or mobile variants thereof and content provider/server 130 may comprise a web server. Billing services (not shown) may also be included to charge access or data fees for services rendered. In one arrangement where service provider 125 provides cellular network access, e.g. acts as a wireless service provider, client software 165 may include instructions for access and communication through the cellular network. Client software 165 may be stored in computer-readable memory 160 such as read only, random access memory, writeable and rewriteable media and removable media in device 110 and may include instructions that cause one or more components—e.g., processor 155, a transceiver, and a display—of device 110 to perform various functions and methods including those described herein.

Figure 2:
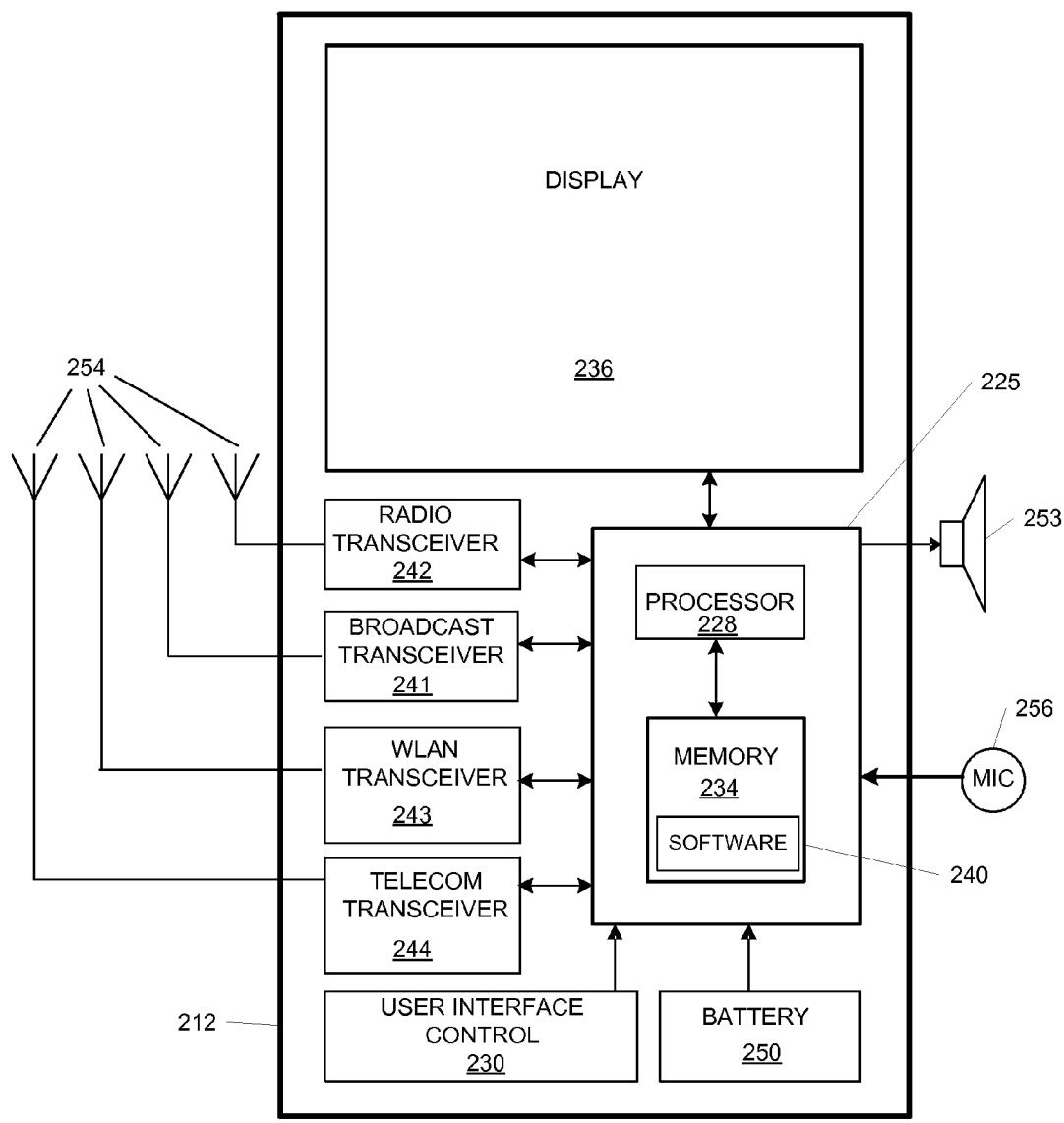
FIG. 2 is a block diagram of an example communication device according to one or more aspects described herein.

FIG. 2 illustrates an example computing device such as mobile device 212 that may be used in network 100 of FIG. 1. Mobile device 212 may include a controller 225 connected to a user interface control 230, display 236 and other elements as illustrated. Controller 225 may include one or more processors 228 and memory 234 storing software 240, e.g. client software 165. Mobile device 212 may also include a battery 250, speaker 252 and antenna 254. User interface control 230 may include controllers or adapters configured to receive input from or provide output to a keypad, touch screen, voice interface—e.g. via microphone 256, function keys, joystick, data glove, mouse and the like.

Computer executable instructions and data used by processor 228 and other components of mobile device 212 may be stored in a storage facility such as memory 234. Memory 234 may comprise any type or combination of read only memory (ROM) modules or random access memory (RAM) modules, including both volatile and nonvolatile memory such as disks. Software 240 may be stored within memory 234 to provide instructions to processor 228 such that when the instructions are executed, processor 228, mobile device 212 and/or other components of mobile device 212 are caused to perform various functions or methods such as those described herein. Software may include both applications and operating system software, and may include code segments, instructions, applets, pre-compiled code, compiled code, computer programs, program modules, engines, program logic, and combinations thereof. Computer executable instructions and data may further be stored on computer readable media including electrically erasable programmable read-only memory (EEPROM), flash memory or other memory technology, CD-ROM, DVD or other optical disk storage, magnetic cassettes, magnetic tape, magnetic storage and the like.

Mobile device 212 or its various components may be configured to receive, decode and process various types of transmissions including digital broadband broadcast transmissions that are based, for example, on the Digital Video Broadcast (DVB) standard, such as DVB-H, DVB-H+, or DVB-MHP, through a specific broadcast transceiver 241. Other digital transmission formats may alternatively be used to deliver content and information regarding availability of supplemental services. Additionally or alternatively, mobile device 212 may be configured to receive, decode and process transmissions through FM/AM Radio transceiver 242, wireless local area network (WLAN) transceiver 243, and telecommunications transceiver 244. Transceivers 241, 242, 243 and 244 may, alternatively, include individual transmitter and receiver components.

Although the above description of FIG. 2 generally relates to a mobile device, other devices or systems may include the same or similar components and perform the same or similar functions and methods. For example, a stationary computer such as PC 115 (FIG. 1) may include the components or a subset of the components described above and may be configured to perform the same or similar functions as mobile device 212 and its components.

Figure 3:
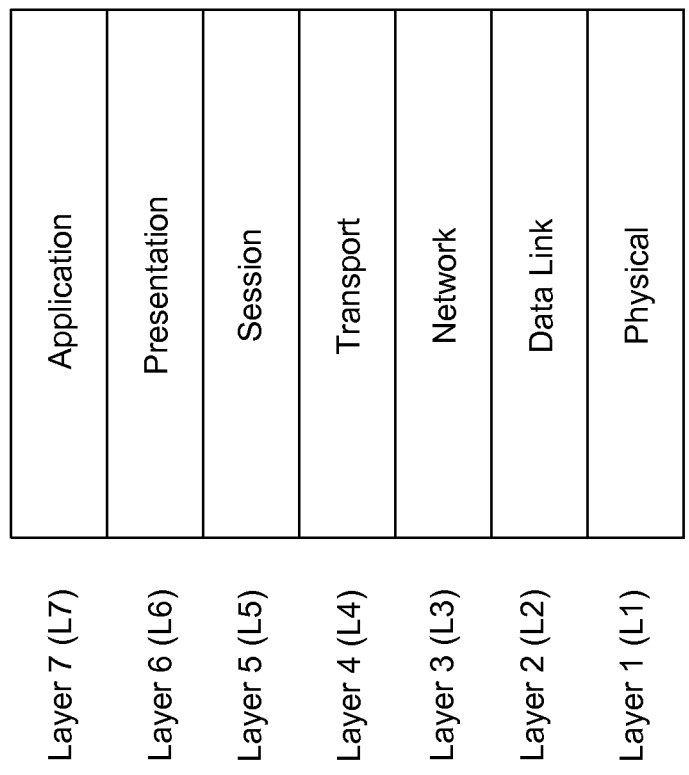
FIG. 3 illustrates an example data model for network transmissions according to one or more aspects described herein.

According to some digital video broadcasting protocols, components that make up a particular service like a content program or an interactive function are mapped through a physical layer pipe (PLP). A physical layer, as used herein, generally refers to a portion of a network protocol that is configured to define hardware-specific operations for effecting the transmission or reception of electronic signals over a data network. The Open Systems Interconnection (OSI) Reference Model, for example, provides for a layered communication architecture including a physical layer. FIG. 3 illustrates one representation of an OSI Reference Model.

A PLP generally refers to a transmission channel between a source and a destination node defined at the physical layer level. The physical layer refers to a low level layer, often the lowest layer, in a protocol stack that is configured to facilitate the transmission of raw bits from a source to a destination. The physical layer may be configured to specify frequencies, voltages, bit rates and the like for transmission of data. The physical layer may define multiple channels—pipes—through which raw bits representative of the data such as broadcast data may be sent. For example, different broadcast services and data associated therewith may be mapped to different physical layer pipes and made available therethrough. Accordingly, the physical layer may be configured to identify the appropriate transmission channel for a series of bits corresponding to a particular service and transmit the data through the identified channel or pipe. In a broadcast arrangement, a PLP may be established between a source and multiple destinations. In one example, a PLP may correspond to a physical layer time-division multiplexed channel that is carried by specified sub-slices of a transmission stream (e.g., DVB-T2 stream). When an end-user device wishes to access a component of a particular service, the end-user device may identify the corresponding PLP or PLPs and access the service data therethrough. In the broadcast scenario, a receiving device may listen for the particular sub-slices corresponding to the PLP or PLPs carrying the desired service or services.

Figure 4:
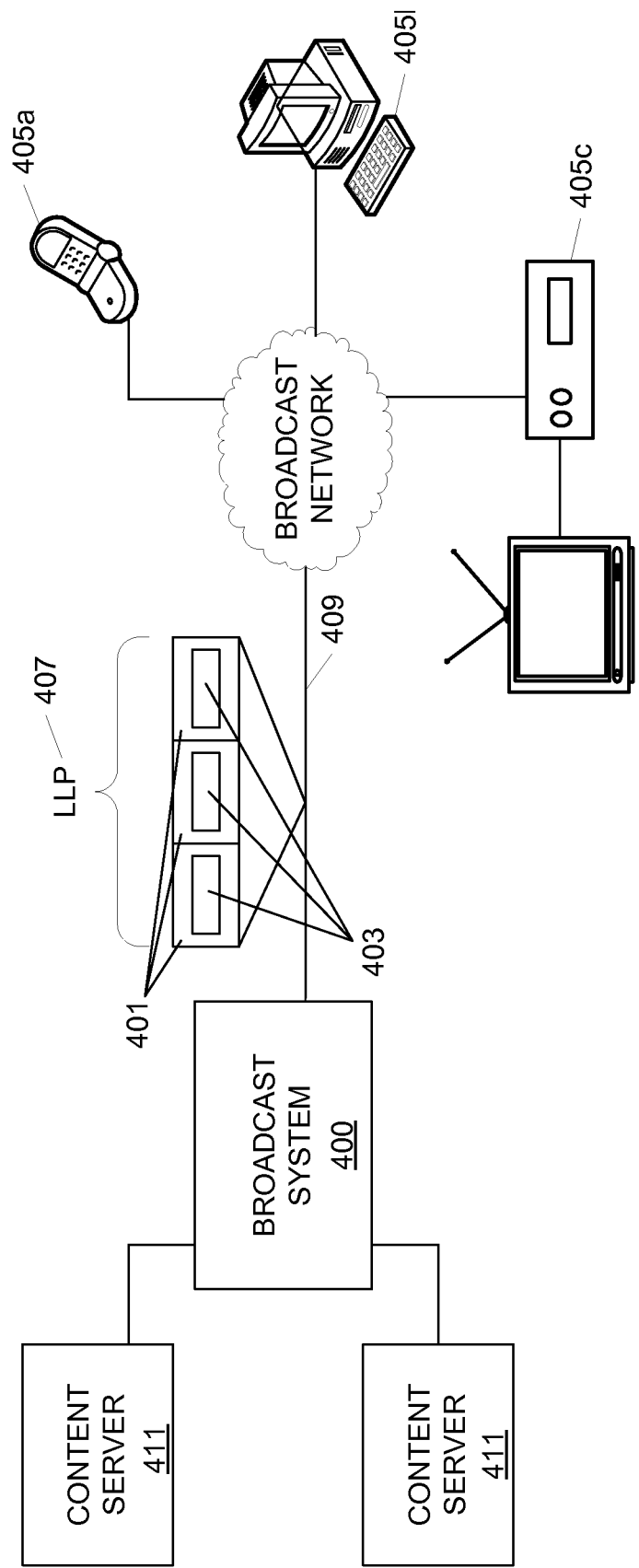
FIG. 4 illustrates a broadcast network in which services and service components are transmitted using physical layer transmission channels according to one or more aspects described herein.

FIG. 4 illustrates a broadcast network in which services and service components, e.g. content provided from content servers 411, are transmitted through multiple PLPs 401 from a broadcast system 400, where each of the PLPs 401 are configured to carry a different broadcast service component, e.g., components 403. PLPs 401 may be defined as segments of a transmission stream 409 that together make up a transmission channel for a particular one of service components 403. Each of components 403 may be mapped to a different one of PLPs 401 to provide the ability to share service components 403 across services. Alternatively or additionally, two components may be mapped to the same pipe depending on a desired configuration (not shown).

Pipes 401 corresponding to components of a single service may be identified by combining PLPs 401 into a logical grouping 407—into a logical layer pipe—that is associated with a service. Logical layer pipes (LLP) generally refer to logical associations such as mappings that link a service or service components to a PLP. LLPs may be defined using various data structures such as tables, lists and the like. PLPs 401 may be identified for accessing components 403 of a service by determining the logical grouping or LLP 407 associated with that service and examining PLP parameters specified thereby. In one example, LLP 407 may be identified in a service descriptor configured to advertise available services to network devices 405—cell phone 405a, computer 405b and set-top box 405c. LLP identification information may be carried in a packet header of the broadcast transmission stream 409. Alternatively or additionally, LLP information—e.g. LLP identifiers—for each service may be specified in electronic service guide data. Thus, upon receiving the packet header and/or electronic service guide data, a receiving device such as cell phone 405a may extract LLP information to identify components of a service and their associated PLPs. LLP signaling is described in further detail herein.

Current PLP architectures and data models generally require that all service components for a service be mapped to a single PLP. Accordingly, the sharing of a service component among multiple services and the application of different functionalities to different service components of a single service, e.g., in scenarios where functionalities are applied on a per-PLP basis, might not be possible. For example, the separate layers of a Scalable Video Codec (SVC) may be configured as different components of a service, each layer of the SVC being mapped to the same PLP. Because the layers of the service are mapped to the same PLP, it might not be possible to apply different functionalities such as error detection or correction to each separate layer of the SVC because the functionalities might generally be applied across an entire PLP, not for each service component in a PLP. Furthermore, in a scenario or a data model requiring mapping all service components for a service to a single PLP, it may not be possible to receive only a subset of the service components of a service. As an example, a service may comprise a video component, and two audio components in different languages, all mapped to a single PLP. Because the both audio components—providing similar information in different languages—are mapped to the same PLP, it might not be possible to receive only one of the audio components.

Figure 5:
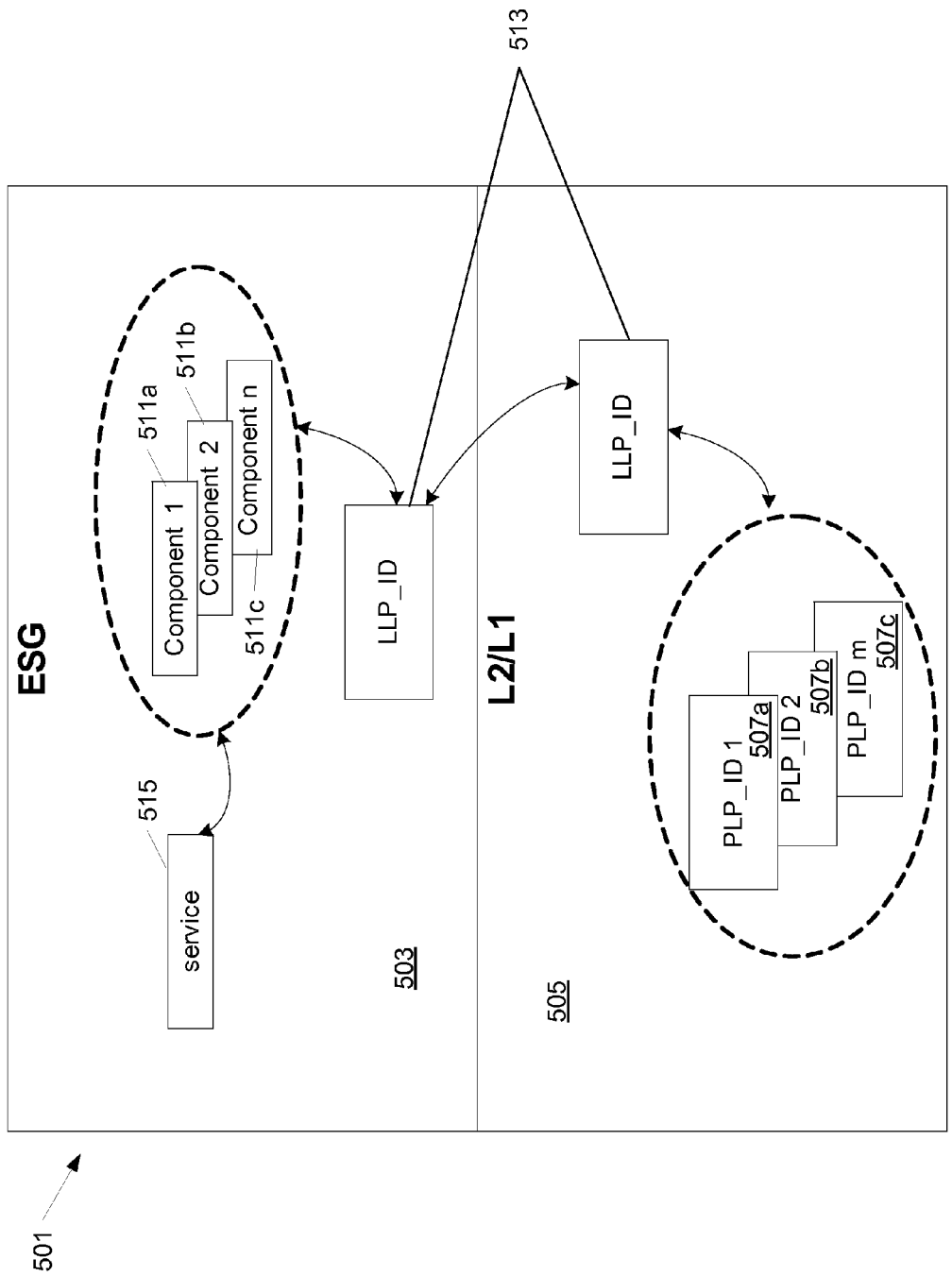
FIGS. 5 and 6 illustrate example signaling protocols and structures using logical layer pipes to associate services and service components to physical layer transmission channels according to one or more aspects described herein.

FIG. 5 illustrates an example broadcasting protocol in which components of a service may be distributed in different PLPs, thereby allowing sharing of service components and the application of different functionalities to different components of a single service. Broadcasting protocol 501 includes an electronic service guide (ESG) layer 503 as well as one or more additional layers 505. The additional layer 505 of protocol 501 may include a physical layer that provides one or more PLPs 507 to which service components 511 for a service 515 advertised in an ESG of ESG layer 503 are mapped. The mapping of the service components to the disparate PLPs 507 is facilitated by a logical layer pipe (LLP) 513. In one example, an LLP such as LLP 513 may define a mapping between a service, e.g. service 515, or service component, e.g. service components 511, and one or more PLPs, e.g. PLPs 507. Accordingly, by using LLPs to define relationships between services or service components and PLPs, service components of a single service may be mapped to a set of more than one PLP. The mapping facilitated by the LLP may further allow service components of a single service to be mapped to disparate PLPs.

As illustrated in FIG. 5, LLP 513 maps the set of service components 511 corresponding to service 515 to PLPs 507. For example, service component 511a and 511c may be mapped to PLP 507b, while service component 511b may be mapped to PLP 507a. In such a configuration, a receiving device may discover the service components 511 through service 515 and subsequently identify a set of corresponding PLPs 507 carrying components 511 using the mapping provided by LLP 513. For example, a table or other data structure corresponding to LLP 613 may be defined mapping service components 511 to PLPs 507. A separate data structure may also be defined mapping service components 511 to service 515.

Figure 6:
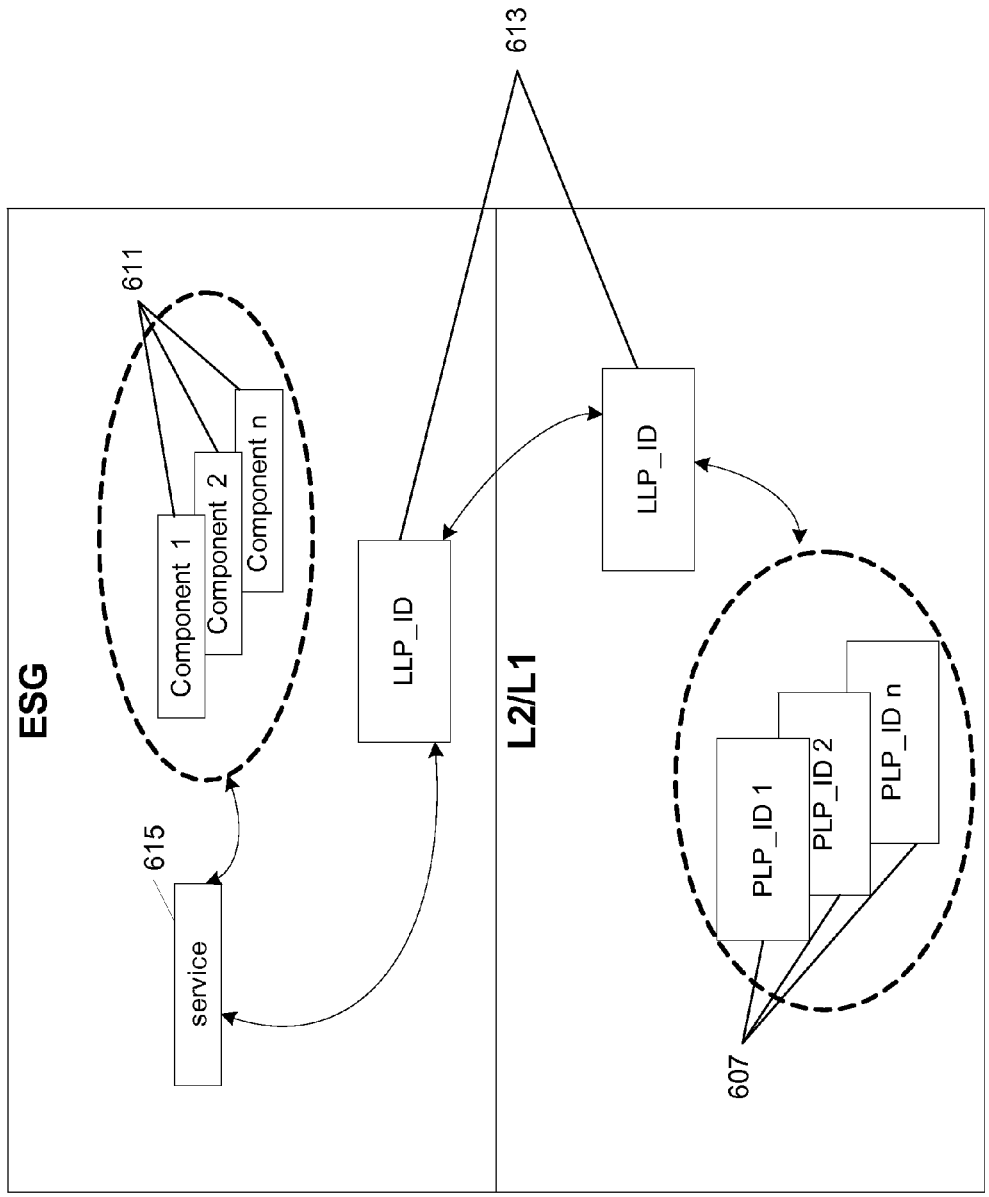

Alternatively, in an example illustrated in FIG. 6, LLP 613 defines an association between service 615 and PLPs 607 to which components 611 are mapped. Accordingly, the association or linking of service components 611 with LLP 613 and PLPs 607 is configured indirectly through service 615. Thus, discovery of PLPs 607 may be conducted through service 615—e.g. by, inspecting service parameters for LLP data—rather than through service components 611—as may be the case in the example illustrated in FIG. 5. In one example, a structure such as a table may be defined mapping service 615 to LLP 613 while a separate structure may be defined for mapping service 615 to service components 611.

Figure 7:
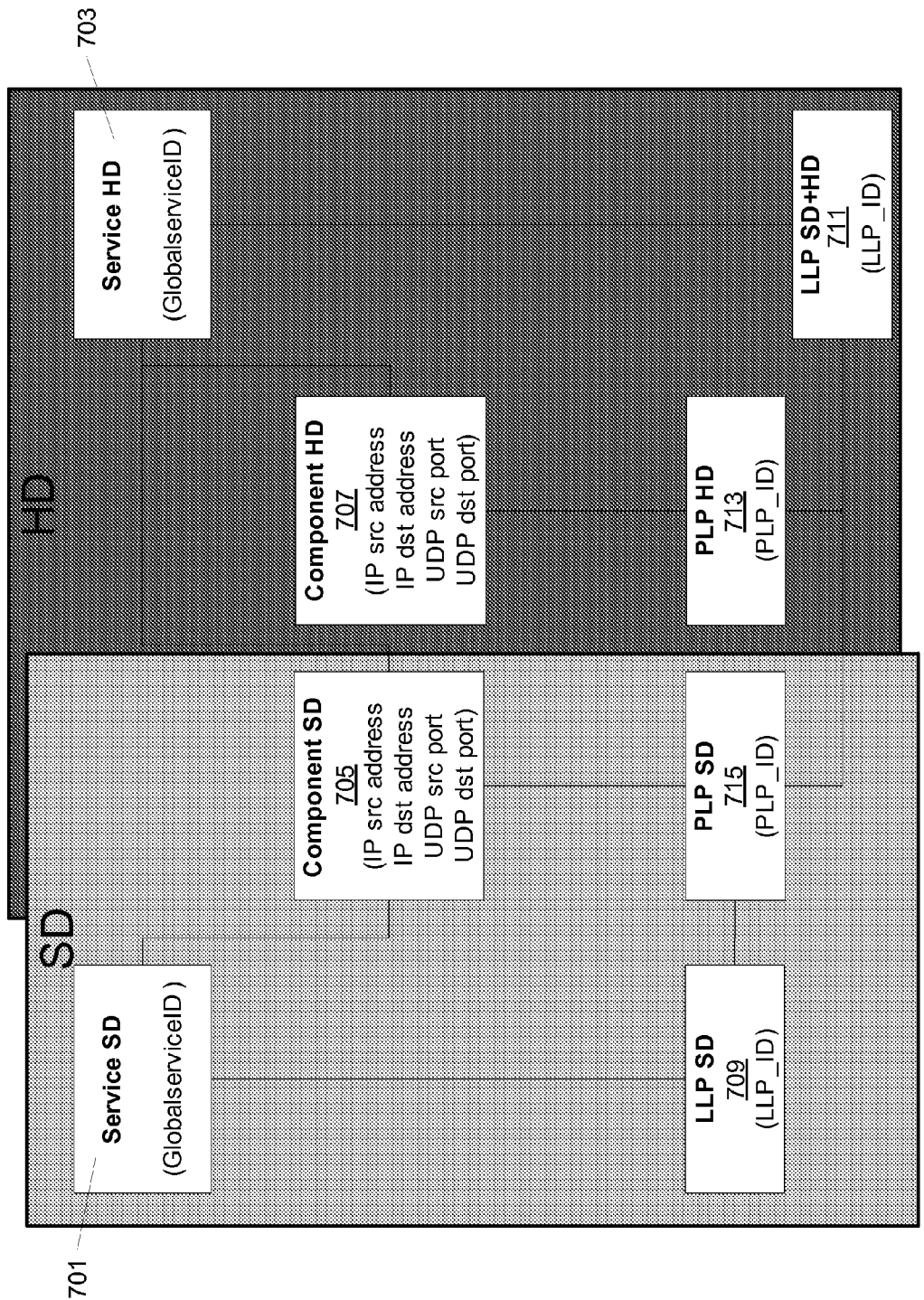
FIGS. 7-10 illustrate example signaling configurations for broadcasting various services according to one or more aspects described herein.

FIG. 7 illustrates an example mapping of service components for providing high definition and standard definition content, e.g. by using a scalable video codec. A scalable video codec may include standard definition (SD) service 701 and high definition (HD) service 703 for defining different levels of video quality. SD service 701 may comprise a first set of content signals that define a first level of video quality while HD service 703 may include a second set of signals that increases video quality to a second level higher than the first when added to the first set of content signals. For example, when a client requests HD content, HD service 703 may provide both SD signals and HD signals associated with the requested content to the client. Quality may be defined by resolution, refresh rates, frames per second and the like. The SD content may be defined as a SD service component 705 while the HD content may be defined as a HD service component 707. Thus, while SD service 701 might only need SD service component 705, HD service 703 may require access to both SD service component 705 and HD service component 707. Instead of having to duplicate SD service component 705 for each of SD service 701 and HD service 703, LLPs 709 and 711 allow for services 701 and 703 to share SD service component 705.

LLPs 709 and 711 are each associated with one or more PLPs 713 and 715. In the illustrated example, SD service component 705 may be mapped to PLP 715, implying that SD content may be accessed through PLP 715, while HD service component 703 may be mapped to PLP 713, implying that HD content may be accessed through PLP 713. Although SD service component 705 and HD service component 703 are both parts of HD service 703, they may be mapped to different PLPs 713 and 715 by using LLPs—e.g. LLPs 709 and 711—so that SD service component 705 may be shared. Thus, LLP 709 corresponding to SD service 701 may be associated with PLP 715 while LLP 711 corresponding to HD service 703 may be associated with PLPs 713 and 715. Because shared service components might not need to be duplicated for different services, networking, processing and storage resources may be reduced.

Each of SD and HD services 701 and 703 may be identified by a global service identifier that is known in a broadcast network. A device may request a particular service by using the global service identifier corresponding thereto. A service component such as SD service component 705 or HD service component 707, on the other hand, may be defined for example by one or more sources addresses, destination addresses, source ports and destination ports. Further, each of LLPs 709 and 711 and PLPs 713 and 715 may be assigned an LLP identifier and PLP identifier, respectively.

Figure 8:
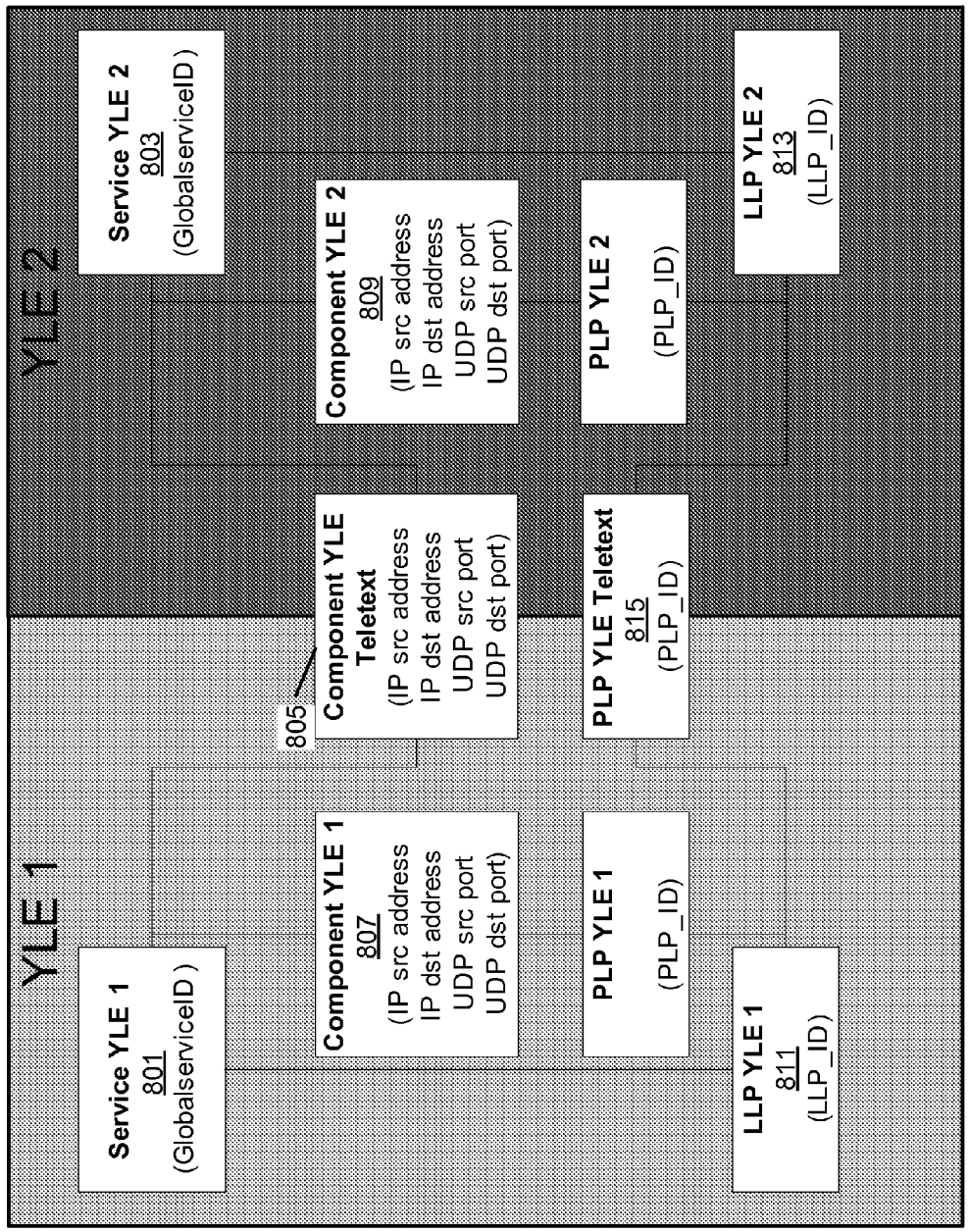

FIG. 8 illustrates another example mapping of service components to PLPs using LLP, the example mapping being used to provide a teletext service in a television broadcast environment. Multiple broadcast channels may include teletext, which can be referenced as a rough version of digital newspaper or message board. Usually teletext services cover news, information about television programs, weather information etc. Teletext is used to provide an information service as part of the broadcast. In current systems, a separate teletext service component may be provided for each broadcast or broadcast service—e.g., channels, interactive functions, etc. With many broadcasts or broadcast services using teletext, additional resources may be needed in the broadcast medium and at the broadcast source. Aspects described herein allow for multiple broadcast services such as service 801 and service 803 to share a teletext service component 805 while still providing different additional service components 807 and 809—e.g., video, audio, images, text. Using LLPs 811 and 813, services 801 and 803, respectively, may include teletext service component 805 by mapping component 805 to corresponding PLP 815 shared by LLPs 811 and 813.

Figure 9:
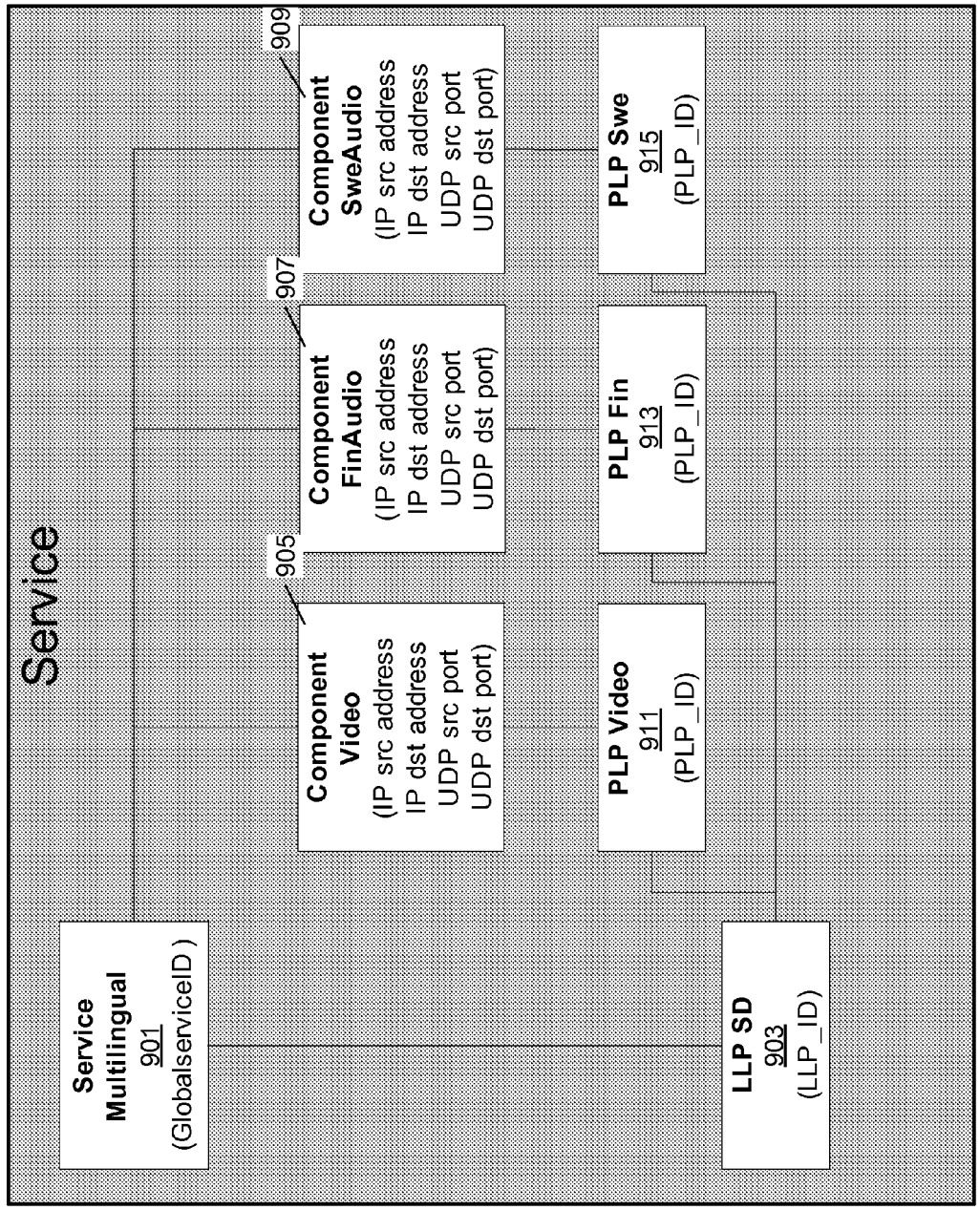
Figure 10:
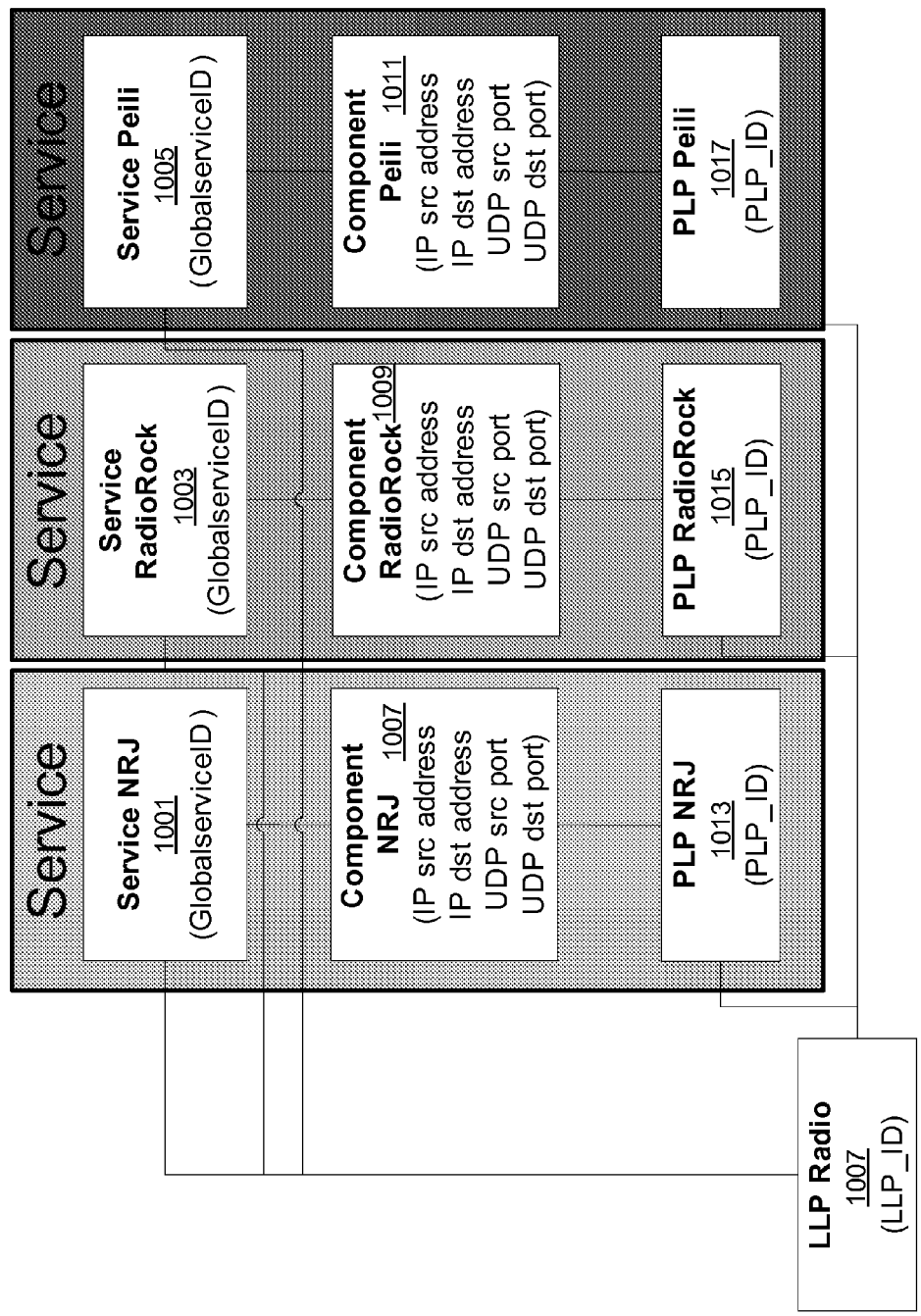

FIGS. 9 and 10 illustrate additional examples of mapping service components in other contexts such as multilingual services, as illustrated in FIG. 9, and fast zapping, (as illustrated in FIG. 10). The zapping corresponds to a procedure where an end user switches into another channel. Typically end users want this to happen fast. In the example of multilingual services, FIG. 9 illustrates that a service 901 may be associated with a LLP 903 that maps multiple service components such as video 905, Finnish audio 907 and Swedish audio 909 to corresponding PLPs 911, 913 and 915, respectively. Because service components 907 and 909 are associated with service 901 despite being mapped to different PLPs 913 and 915, respectively, service 901 may allow a user to switch between Swedish or Finnish audio. LLP 903 facilitates this process by providing a mapping between service 901 and the PLPs 911, 913 and 915 associated with each of the service components 905, 907 and 909. For example, service 901 may selectively activate or use one of audio service components 907 and 909 via LLP 903 and PLPs 913 and 915 depending on a language selected.

In another example, FIG. 10 illustrates a mapping structure in which different radio services 1001, 1003 and 1005 including different service components 1007, 1009 and 1011, respectively, are all linked to a single LLP 1007. LLP 1007, in turn, maps each of services 1001, 1003 and 1005 to all three PLPs 1013, 1015 and 1017, giving each of services 1001, 1003 and 1005 to access any of the three different service components 1007, 1009 and 1011. Using this configuration, a user subscribed to service 1003 may access content provided by service component 1007, even though service component 1007 is included in service 1001. Switching between content (i.e., zapping) provided by components 1007, 1009 and 1011 may also be faster because a user would not have to wait for the completion of a subscription process—e.g. to a corresponding service—prior to obtaining access to requested content. That is, requiring the user to unsubscribe from one service, e.g. service 1003, and subscribe to another service, e.g. service 1001, to access different content may increase the amount of time required to switch between content. Instead, if subscription is required, access to the requested content may be provided in the above described manner while a user completes a subscription process.

Figure 11:
FIG. 11 illustrates an example receiver buffer for receiving and consuming logical layer pipe information according to one or more aspects described herein.

FIG. 11 illustrates an example receiver buffer model that may be used for receiving LLPs. In particular, receiver buffer 1101 is configured to receive and consume an LLP frame. For example, receive buffer 1101 may be configured to parse the LLP frame and extract relevant information such as packet header data that defines a structure of the frame—e.g. size of a slice, PLP frames corresponding to service components and the like. The receiver buffer 1101 may further be configured to determine an amount of time required for consumption of the frame. This value may be provided as the parameter $T_{OUT\_LLP}$. The relevance and application of $T_{OUT\_LLP}$ is described in further detail below. The receiver buffer may be of a specified size $B_R$.

Figure 12:
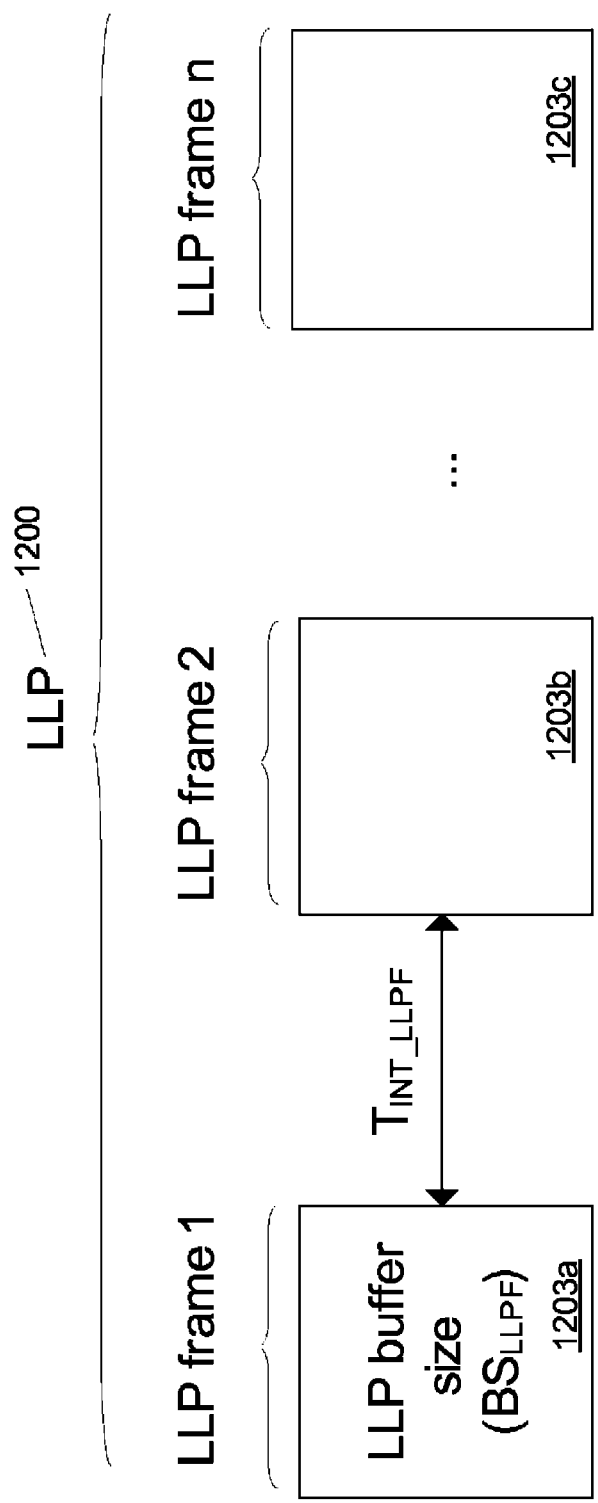
FIG. 12 illustrates an example transmission of LLP frames in an LLP according to one or more aspects described herein.

FIG. 12 illustrates an example structure of an LLP. An LLP 1200 may be comprised of multiple frames 1203, which may be used to allow for the fair division of resources in a broadcast transmission stream. Accordingly, a first frame 1203a of LLP 1200 may be transmitted at time T1, while a second frame 1203b may be transmitted at time T2 and a third frame 1203c is transmitted at time T3. The interval between the transmission of each of frames 1203 may be defined by a parameter $T_{INT\_LLPF}$. $T_{INT\_LLPF}$ defines the amount of time between two consecutive frames, e.g. frames 1203a and 1203b, of a particular LLP such as LLP 1200. During the time between frames of LLP 1200, frames of other LLPs may be transmitted. Accordingly, transmission bandwidth and resources may be divided amongst multiple LLPs. Furthermore, to avoid backlog and increase transmission and processing efficiency, a transmission protocol may adhere to the equation $T_{OUT\_LLP} \leq T_{INT\_LLPF}$. This equation allows for LLP frame 1203b, for example, to be consumed by the receiver prior to receiving another LLP frame 1203c. Additionally, a buffer size of LLP frame 1200 may be required to be less than or equal to the buffer size of the receiver. Again, such a rule may be implemented to reduce potential for backlog and network slowdown. Alternatively or additionally, gaps may be scheduled for one or more LLP frame slots to allow for power saving. For example, LLP frame 1203b may be transmitted $2*T_{INT\_LLPF}$ after the transmission LLP frame 1203a so that a receiver may power down during the slot provided $T_{INT\_LLPF}$ after the transmission of LLP frame 1203a.

In one or more configurations, LLP frames may vary in size from frame to frame. LLP frame size may be defined as $BS_{LLPF}$. This frame size may be, for example, the size of the largest LLP frame within an LLP. A receiver may determine whether it has buffering capacity to receive an entire LLP based on the $BS_{LLPF}$ and a time between two consecutive frames of a LLP, indicated e.g. by $T_{INT\_LLPF}$ as described above. Additionally or alternatively, $BS_{LLPF}$ may be required to be less than or equal to $B_R$ for reception of a LLP.

Figure 13:
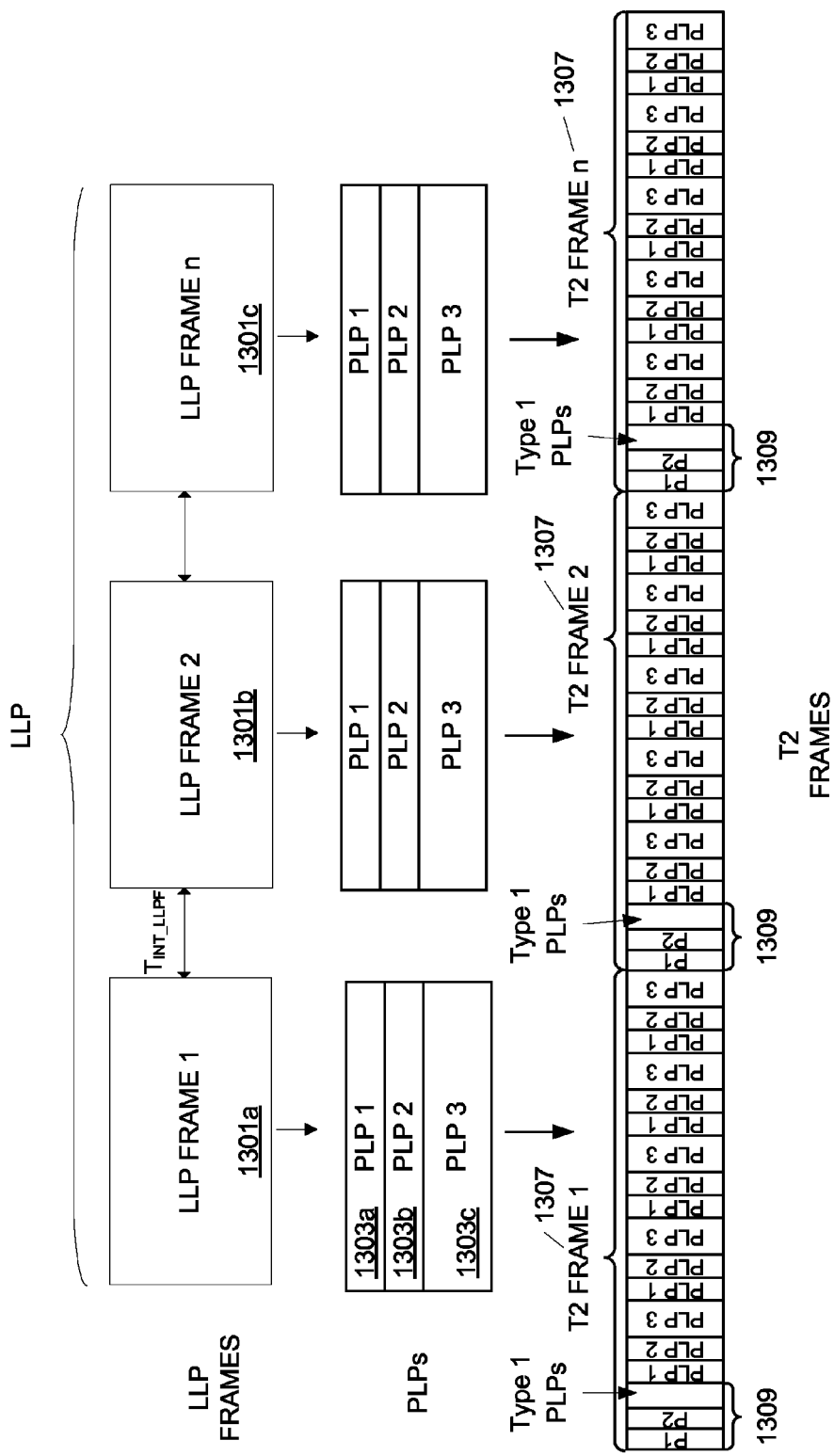
FIGS. 13 and 14 illustrate example transmission configurations in which an LLP frame and associated PLP frames are transmitted according to a digital video broadcast protocol.

FIG. 13 illustrates an example transmission protocol and structure in which LLP frames are transmitted in T2 frames of a DVB-T2 protocol. Each LLP frame 1301 encompasses a set of PLPs 1303 to which service components of a corresponding service are mapped. PLPs, as illustrated, may be defined by specified slots or slices and packet sizes in a transmission stream. For example, PLP 1 might be defined as occupying the $1^{st}$, $4^{th}$, $7^{th}$ and $10^{th}$ slices in a payload portion of a T2 frame. A PLP such as PLP 1303c may occupy twice the number of available slots or slices if, for example, PLP 1303c is twice as large as each of PLP 1303a and 130b. A remainder 1309 of each T2 frame 1307 is apportioned to header data such as P1 and P2 and other LLP frames of other services. During transmission of one or more of the other portions 1309 of T2 frames 1307, a receiver interested in only the service corresponding to LLP frames 1301 may shut down various components for power saving purposes. For example, a receiver may be awake to inspect a frame header including preamble symbols (e.g., P1 and P2) of the stream and shut down thereafter until relevant PLPs are to be received. Preamble symbols may be used during the initial signal scan for fast recognition of a signal (e.g., T2), for which just the detection of P1 is enough. Preamble symbols may also be used to identify the preamble itself as a specific type of preamble (e.g., a T2 preamble). Additionally, preamble symbols may be used to signal basic transmission parameters that are needed to decode the rest of the preamble which can help during the initialization process. P1 may also be used to enable the receiver to detect and correct frequency and timing synchronization.

Alternatively or additionally, a remainder of T2 frames 1307 not occupied by PLPs 1303 might not include LLP frames for other services and may instead be configured to provide power conservation or processing time for the receiver. In the illustrated example, LLP frames 1301 may be preceded by type '1' PLPs or other types of PLPS. Type 1 PLPs may generally refer to PLPs having one slice per frame. LLP frames 1301 may be PLPs of type 2, which generally refers to PLPs having two or more sub-slices per frame. The amount of time between each of LLP frames 1301 may be $T_{INT\_LLPF}$ to provide sufficient time for a receiver to consume the previously received LLP frame.

Figure 14:
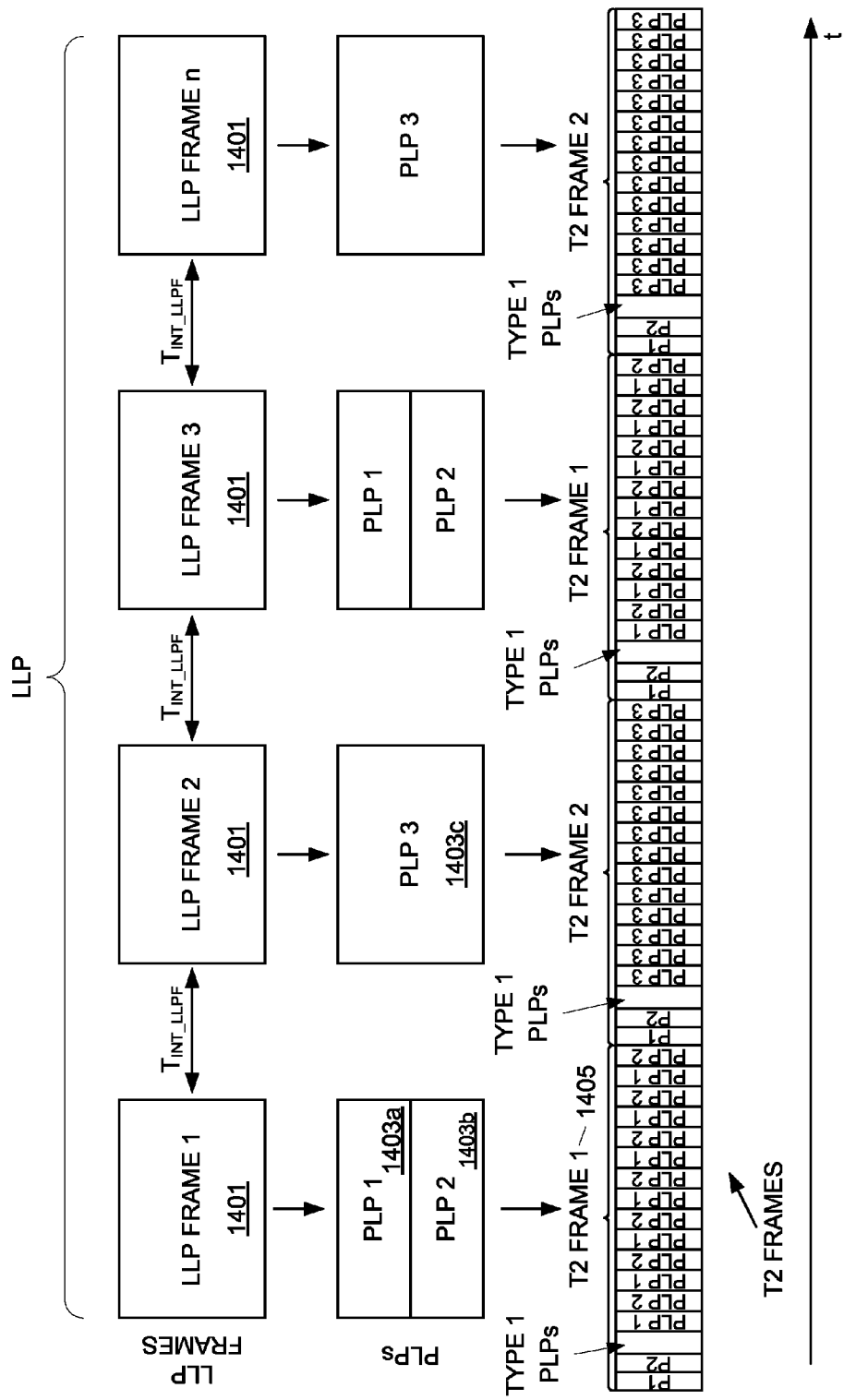

FIG. 14 illustrates another example transmission protocol and structure in which LLP frames 1401 of a service alternate between carrying two PLPs 1403a and 140b and a single PLP 1401c. Accordingly, if each of LLP frames 1401 is allotted 14 slices of a T2 frame 1405, PLPs 1403a and 1403b may each occupy 7 slices while PLP 1403c may be given the entire allotment of 14 slices given its greater size. Further, assuming that the sizes of PLPs 1403a, 1403b and 1403c are equal to the sizes of PLPs 1203a, 1203b and 1203c, respectively, a receiver operating under the transmission method and structure of FIG. 14 may require half the resources—e.g. in terms of buffer capacity—as the receiver operating under the system of FIG. 13 since half the amount of data is transmitted in any one of LLP frames 1401. However, depending on the frequency of transmission of LLP frames 1401 as defined by $T_{INT\_LLPF}$, for example, transmission of all LLP frames 1401 in a service may require more time than using the configuration of FIG. 13.

FIG. 15 illustrates an example signaling structure for a section of a table associating services or service components with an LLP. A signaling structure may define the manner in which data is ordered and structured in a transmission packet or stream. The signaling structure 1500 may be defined using the following variables and information:

Table_id: An identifier for a table associating services with service components and a corresponding LLP. A table may include multiple sections, where each section corresponds to a service.

Section_syntax_indicator: The section_syntax_indicator is a 1-bit field which shall be set to a predefined value, for example to value "1".

Section_Length: A 12-bit field that specifies a number of bytes of a section of the table, starting immediately following the section_length field and including the cyclic redundancy check field CRC_32. A section generally refers to a section of a table (e.g., a program specific information/service information table), wherein each section may correspond to a different service.

Version_Number: A 5-bit field identifying the version of the table. The version number may be incremented by 1 when a change in the information carried within the table occurs. When the version number reaches a value of 31, it wraps around to 0 upon incrementation.

Current_next_indicator: This may be a 1-bit indicator that, when set to "1" indicates that the currently applicable table is the current version of the table (i.e., sub table). A value of "0," however, indicates that the currently applicable table is the next version of the table.

Last_section_number: An 8-bit field specifying the number of the last section of the sub_table of which the section is a part. The last section number may further be used to determine the number of sections within a table.

Identifier_loop_length: A 12 bit field indicating the length of the identifier loop.

Identifier_type: Indicates the type of the associated identifier. Some example types and their corresponding description are illustrated in FIG. 16.

LLP_Id: 16 bit identifier identifies a logical layer pipe within the network (network specified by an identifier such as network_id).

Figure 23:
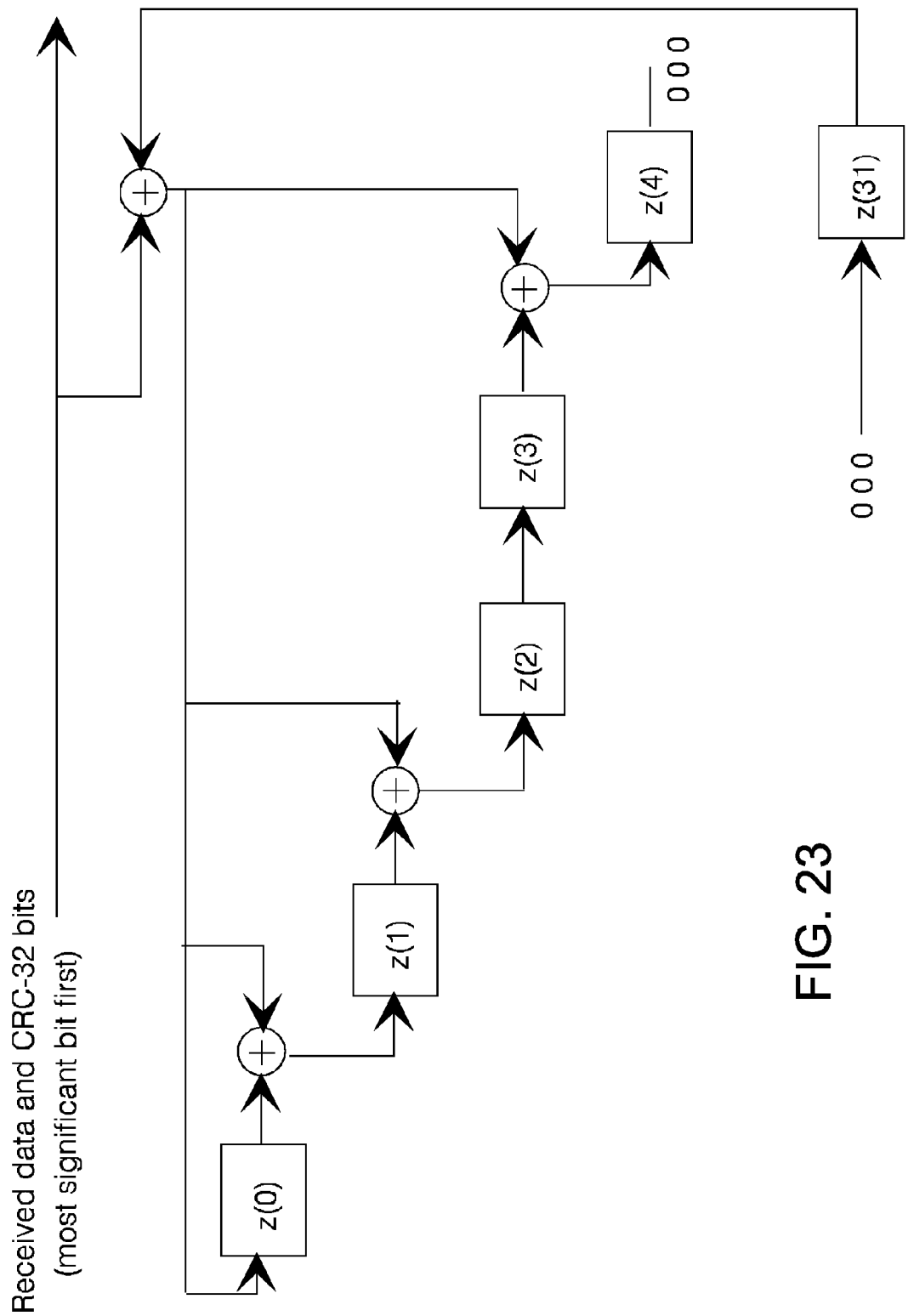
FIG. 23 illustrates an example cylic redundancy check (CRC) decoder according to one or more aspects described herein.

CRC_32: A 32-bit cyclic redundancy checksum (CRC) that contains the CRC value that gives a zero output of the registers in the decoder. A 32-bit CRC decoder operates at bit level and consists of 14 adders+and 32 delay elements z(i). The input of the CRC decoder is added to the output of z(31), and the result is provided to the input z(0) and to one of the inputs of each remaining adder. The other input of each remaining adder is the output of z(i), while the output of each remaining adder is connected to the input of z(i+1), with i=0, 1, 3, 4, 6, 7, 9, 10, 11, 15, 21, 22 and 25 (as illustrated in FIG. 23). This is the CRC calculated with the polynomial:

$$x^{32}+x^{26}+x^{23}+x^{22}+x^{16}+x^{12}+x^{11}+x^{10}+x^{8}+x^{7}+x^{5}+x^{4}+x^{2}+x+1$$

At the input of the CRC decoder, bytes are received. Each byte is shifted into the CRC decoder one bit at a time, with the most significant bit (msb) first, i.e. from byte 0x01 (the last byte of the startcode prefix). First the seven "0"s enter the CRC decoder, followed by the one "1". Before the CRC processing of the data of a section the output of each delay element z(i) is set to its initial value "1". After this initialization, each byte of the section is provided to the input of the CRC decoder, including the four CRC_32 bytes. After shifting the last bit of the last CRC_32 byte into the decoder, i.e. into z(0) after the addition with the output of z(31), the output of all delay elements z(i) is read. In case of no errors, each of the outputs of z(i) is to be zero. At the CRC encoder the CRC_32 field is encoded with such value that this is ensured.

Associated services and service components may be identified in a variety of ways including by IP address, which can be either IPv4 or IPv6, URI, a private type of identifier and the like. For example, a service identified by IPv4 may include an IPv4 source address, e.g. IPv4_src_addr, and an IPv4 destination address, e.g. IPv4_dst_addr.

Figure 17:
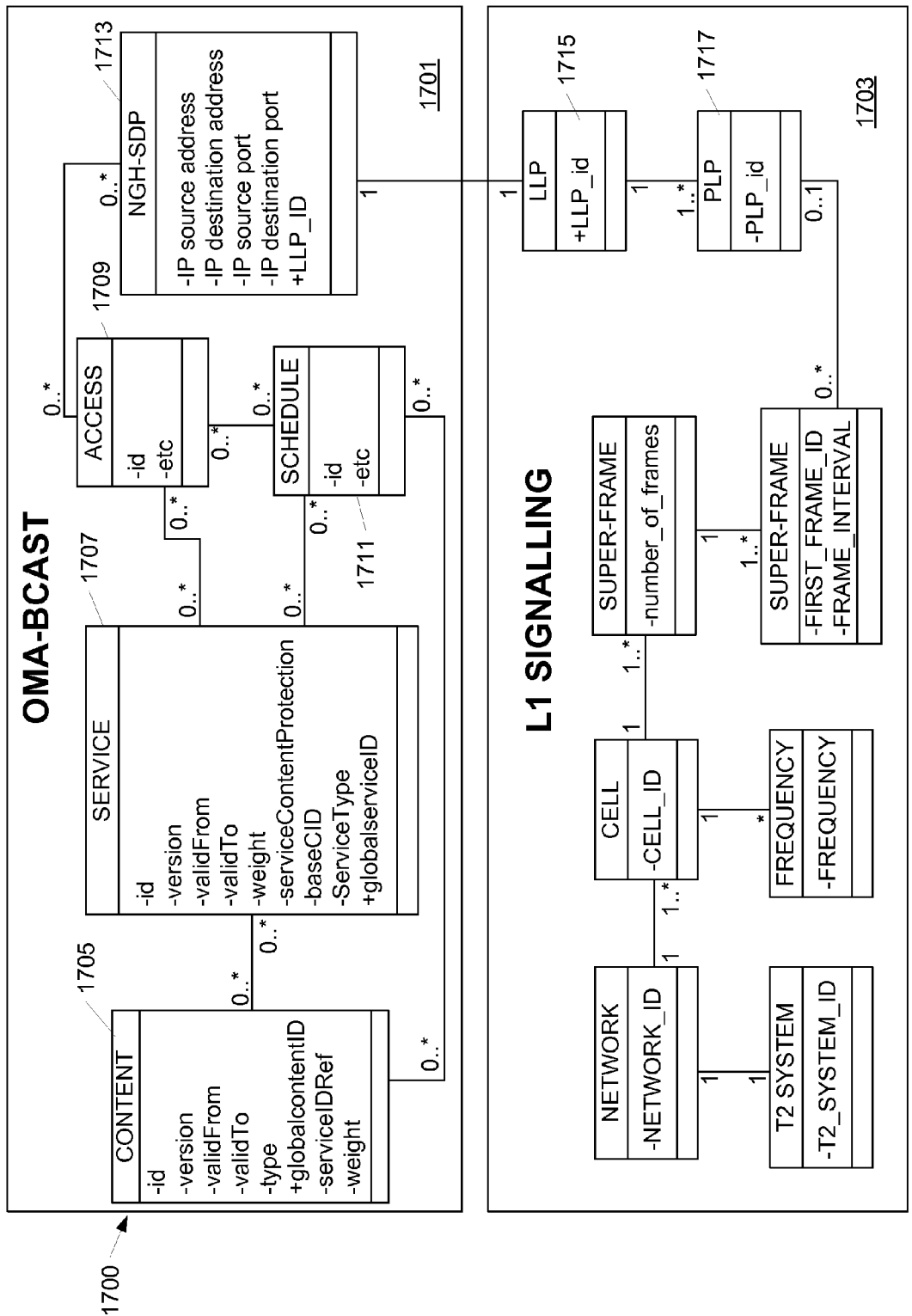
FIGS. 17-19 illustrate layered data models according to one or more aspects described herein.

FIG. 17 illustrates an example broadcast data model that uses LLPs to associate a service component of a broadcast service with a corresponding PLP. The data model 1700 may include at least two layers, a broadcast layer 1701, e.g. an application layer such as an OMA-BCAST layer, and a signaling layer 1703, e.g. a physical layer. The signaling layer 1703 may be included in any layer and is not restricted to the physical layer. The broadcast layer 1701 may comprise parameters associated with the content 1705, the service 1707, access 1709, scheduling and a service component associated with the service. For example, content information may specify a version number, a validity range, a global content identifier and an associated service identifier. The service component, in one or more arrangements, may be expressed according to session description protocol (SDP) 1713. Service information 1707 may similarly include a version number, validity range, identifier as well as content protection information and service type. Each session description protocol 1713 entry may correspond to a service component of service 1707. In the illustrated example, LLP 1715 is directly associated or linked to service component 1713, mapping service component 1713 to PLP 1717. In one or more configurations, session description protocol 1713 may include an LLP identifier parameter specifying an LLP linked to a corresponding PLP 1717 of service 1707.

LLP 1715 and PLP 1717 may be defined and conveyed in signaling layer 1703, e.g. a physical layer. Although LLP 1715 is illustrated as being linked to a single PLP 1717, LLP 1715 may similarly be linked to multiple PLPs as described herein. PLP 1717 may include a PLP identifier and be linked to information such as a number of frames or a number of super frames—defined e.g. as a group of frames—making up the PLP 1717, a first frame identifier, a frame interval, cell identifier, network identifier, a broadcast system identifier and a frequency. A cell identifier defines a geographic section or cell within a broadcast network. A cell's coverage area within the network may include one or more frequencies.

Figure 18:
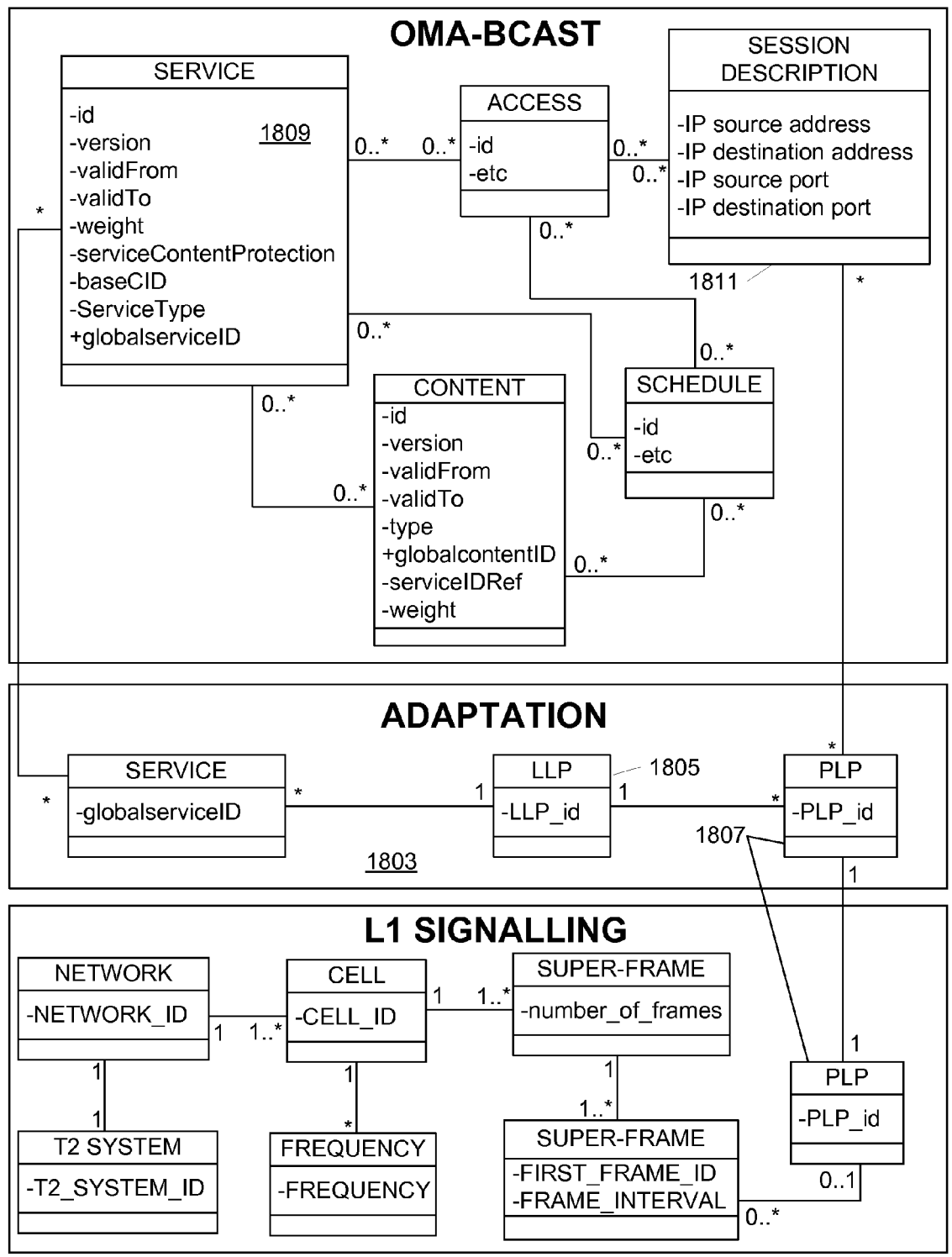

FIG. 18 illustrates an example data model 1801 where an adaptation layer—e.g. an L2 layer in the OSI data model—1803 is used to define LLP 1805 and its association with PLP 1807. Rather than adapting a signaling layer to include LLP information as described in FIG. 17, an association between service 1809 and PLP 1807 is specified through LLP 1805 in adaptation layer 1803. Additionally, instead of a direct association or link between service component 1811 and LLP 1805, as shown in FIG. 17, LLP 1805 is linked to service 1809 and thereby indirectly associated with service component 1811, by virtue of service 1809's identification of and association with service component 1811.

Figure 19:
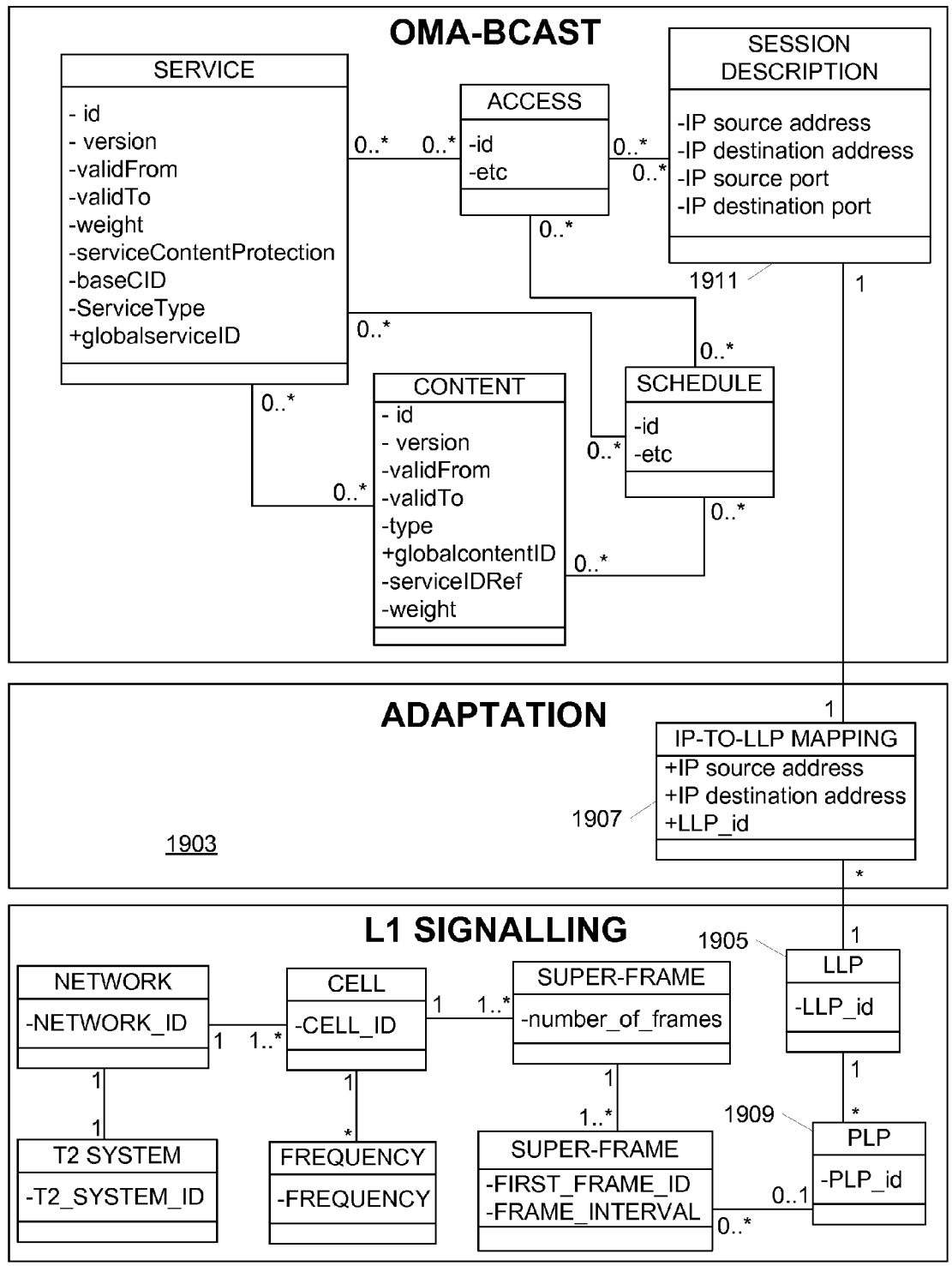

FIG. 19 illustrates an example data model whereby service component 1911 is associated with LLP 1905 through a mapping component 1907 in adaptation layer 1903. In particular, the mapping 1907 may include an IP source address and IP destination address of the service component 1911. Additionally, mapping 1907 may specify an LLP identifier corresponding to LLP 1905. LLP 1905 may then be associated with one or more PLPs such as PLP 1907 to which service component 1911 is mapped or to be mapped. Each service component in a service may be associated with a unique mapping while all mappings for those service components may be associated with the same LLP 1905. This allows a single LLP to be constructed for mapping service components to PLPs in a transmission stream in the configuration of FIG. 19.

FIG. 20 illustrates an example signaling structure for providing an association between LLPs, PLPs and related parameters. LLP associations may be defined in a section of a transmission and may have a specified number of LLPs. The size of the section may correspond to the number of LLPs. Each LLP may be associated with a set of PLPs, a number of PLPs in the set defined by, for example, the variable PLP_loop_length. Each LLP may further be identified by an identifier such as LLP_ID. The time between LLP frames in a transmission may be represented by T_INT_LLPF while the size of the largest LLP frame within an LLP may be specified by BS_LLPF.

Figure 21:
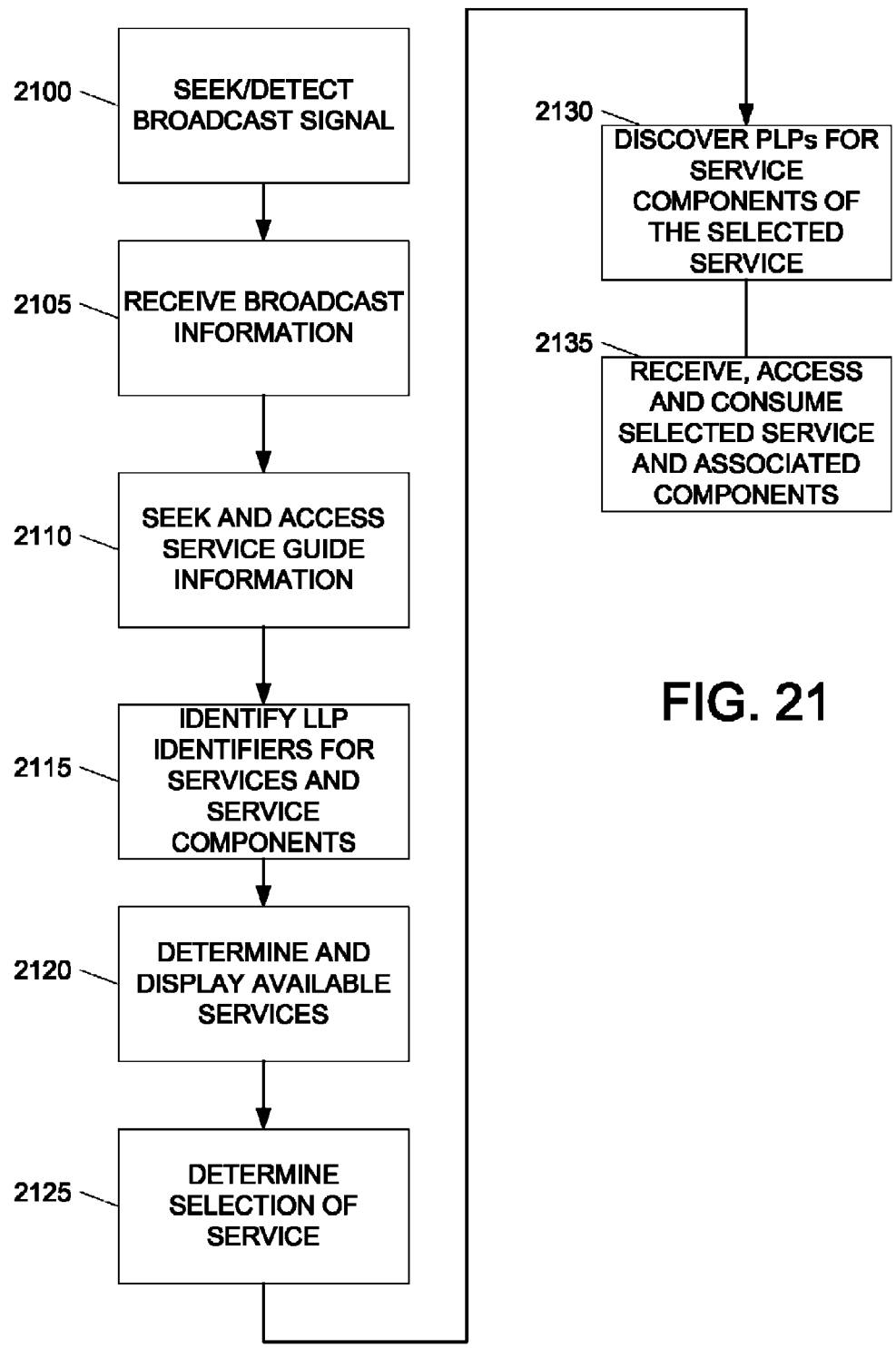
FIG. 21 illustrates an example method for receiving and accessing a service according to one or more aspects described herein.

FIG. 21 illustrates an example method by which a user may discover and access a service and its associated service components. In step 2100, a receiving device such as a mobile terminal or set top box may seek or otherwise detect a broadcast signal. The broadcast signal may advertise multiple services that each includes one or more service components. Once the broadcast signal has been detected and identified, the receiving device may then receive broadcast information signals associated with the services or service components available in the broadcast in step 2105. For example, layer 1 and layer 2 signaling may be received. Layer 1 signaling may include, for instance, electronic service guide information while layer 2 may include an adaptation layer including logical layer pipe data. In step 2110, service guide information may be sought and accessed by the receiver based on the broadcast information signals received in step 2105. In step 2115, the receiver may subsequently identify logical layer pipe identifiers for services and service components available in the broadcast. This may be accomplished by examining service guide information or a service information table provided in the broadcast information signal.

In step 2120, using the logical layer pipe identifiers, the receiver may determine—and possibly display—available or receivable services. The determination may be performed by inspecting a receiver buffer storing programming and service information for parameters associated with each logical layer pipe identifier. The parameters may include, for example, descriptions, identifiers, service components and the like of services available in the broadcast network. In one example, LLP and service associations may be stored in a PSI/SI table. In step 2125, the receiver may determine a selection of a service made—for example by a user. In step 2130, the receiver may discover or otherwise determine physical layer pipes to which service components associated with the selected service are mapped. As described herein, the logical layer pipe associated with a particular service or service component identifies the physical layer pipes to which the service components are mapped. Accordingly, the receiver may identify the appropriate PLPs using the LLP. Once the corresponding PLPs have been identified, the receiver may begin receiving, accessing and consuming the service and the associated service components through their respective PLPs in step 2135. That is, the receiver may determine which frames and/or slices are assigned to a particular PLP configured to carry the service components. In one or more configurations, the receiving device may selectively access service components of a service by identifying and accessing specific PLPs corresponding to desired components. In one example, a service component may be defined according to a session description protocol (SDP) format that includes an identifier specifying the PLP to which it is associated. Thus, a receiving device may be able to determine a particular PLP for accessing a specific service component.

In one or more configurations, a receiver may determine which service components of a service are desired. For example, if a receiver or terminal is not capable of rendering high definition content, the receiver might only access standard definition content data of a high definition content service. In particular, the receiver might not access high definition content data due to its inability to render or process such data. Accordingly, the receiver might only identify the PLP(s) associated with desired service components, rather than all service components.

Figure 22:
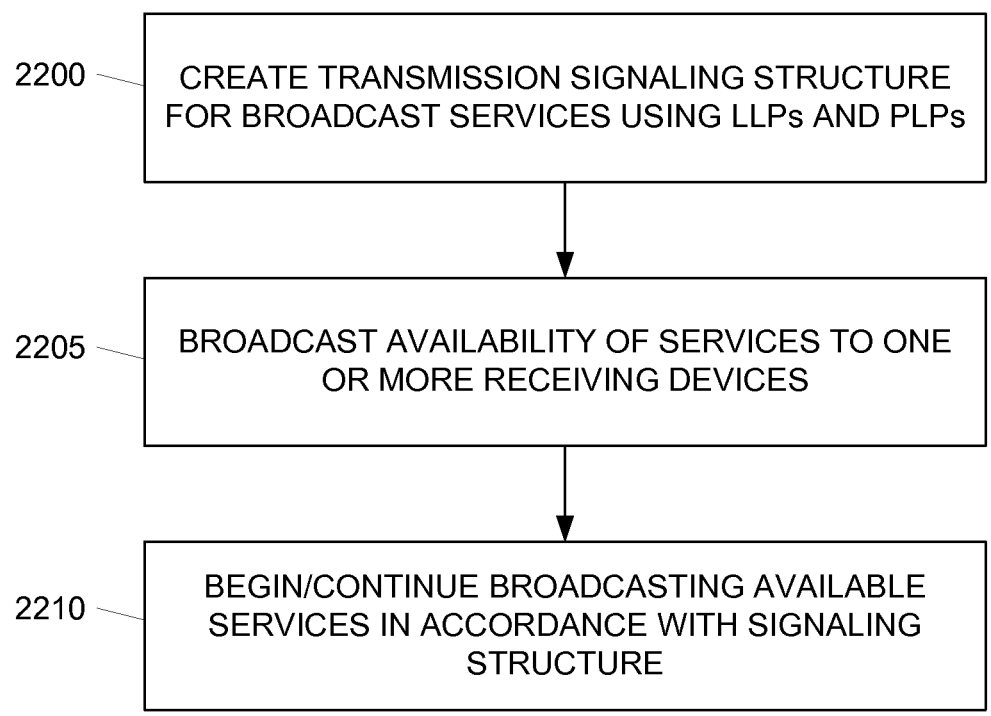
FIG. 22 illustrates an example method for establishing a signaling protocol and structure for broadcasting a service and associated service components according to one or more aspects described herein.

FIG. 22 illustrates an example method for broadcasting services and associated service components using LLPs and PLPs. In step 2200, prior to or concurrently with broadcasting the availability of services, as in step 2205, the broadcast system may define or create a transmission signaling structure described herein by mapping service components or services with corresponding PLPs through the use of LLPs. For example, a number of PLPs may first be defined for carrying service components of a service. The number of PLPs may be depend on whether service components need to be shared or treated differently, e.g. in terms of error correction or detection protocols and the like. LLPs may then be constructed to correlate the PLPs to the service components or services. In step 2205, the system may broadcast the availability of services through a network to one or more network devices. The broadcast may include service information such as an electronic service guide. The electronic service guide or other service information may allow network devices to identify the LLPs associated with each service or service component advertised in the broadcast. The LLPs may further facilitate the identification of PLPs carrying specified service components or services. A receiving device may thus subscribe to a desired service and access the service as well as associated service components through discovering the LLPs and PLPs associated therewith. In step 2210, the broadcast system may begin or continue to broadcast the available services and service components in accordance with the LLP and PLP signaling structure. From a receiving device's perspective, service and service component information may be received and accessed upon identifying the appropriate LLPs and PLPs associated therewith.

In one example embodiment, a method according to aspects described herein may include identifying a first service component and a second service component associated with a broadcast service; generating a logical layer pipe; and mapping the first service component to a first physical layer transmission channel and the second service component to a second physical layer transmission channel through the logical layer pipe. Additionally or alternatively, the method may further include associating the logical layer pipe to the broadcast service, generating a first mapping component for the first service component and linking the first service component to the logical layer pipe through the first mapping component, and/or generating a second mapping component for the second service component and linking the second service component to the logical layer pipe through the second mapping component.

In another example embodiment, one or more computer readable media may store computer readable instructions that, when executed, cause an apparatus to identify a first service component and a second service component associated with a broadcast service, generate a logical layer pipe, and map the first service component to a first physical layer transmission channel and the second service component to a second physical layer transmission channel through the logical layer pipe. Additionally or alternatively, the computer readable instructions, when executed, may further cause the apparatus to link the logical layer pipe to the broadcast service, generate a first mapping component for the first service component and link the first service component to the logical layer pipe through the first mapping component, generate a second mapping component for the second service component and link the second service component to the logical layer pipe through the second mapping component, generate a first mapping component for the first service component and link the first service component to the logical layer pipe through the first mapping component, generate a second mapping component for the second service component and link the second service component to the logical layer pipe through the second mapping component, and/or transmit a broadcast signal to a receiving device, wherein the broadcast signal includes identification information of the logical layer pipe.

In yet another example embodiment, an apparatus according to aspects described herein may include means for receiving a broadcast signal comprising a first broadcast service associated with a first service component, means for determining a logical layer pipe associated with the first broadcast service, means for determining a first physical layer transmission channel to which the first service component associated with the first broadcast service is mapped based on the logical layer pipe, wherein the first physical layer transmission channel is different from the logical layer pipe, and means for accessing the first service component for the first broadcast service through the first physical layer transmission channel. The means for receiving a broadcast signal may include a receiver buffer. Additionally or alternatively, the broadcast signal may include a second broadcast service sharing the service component with the first broadcast service and the apparatus may further include means for determining a second logical layer pipe associated with the second broadcast service, means for determining that the first service component is mapped to the first physical layer transmission channel using the second logical layer pipe, and means for accessing the first service component for the second broadcast service through the first physical layer transmission channel. Further, the apparatus may include means for determining that the first broadcast service includes a plurality of service components, and means for determining one or more service components of the plurality of service components to access based on a receiver capability.

It should be understood that any of the method steps, procedures or functions described herein may be implemented using one or more processors in combination with executable instructions that cause the processors and other components to perform the method steps, procedures or functions. As used herein, the terms "processor" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAS), controllers, application-specific integrated circuits (ASICS), combinations of hardware/firmware/software, or other special or general-purpose processing circuitry.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
   receiving a broadcast signal comprising a first broadcast service associated with a first service component;
   receiving a service association table that includes associations between the first broadcast service and a plurality of physical layer transmission channels that are configured to carry the first broadcast service;
   identifying, based on the service association table, the plurality of physical layer transmission channels that are associated with the first broadcast service;
   determining a first physical layer transmission channel carrying the first service component from the plurality of physical layer transmission channels;
   determining, from the service association table, one or more buffer parameters for the first broadcast service; and
   accessing the first service component for the first broadcast service through the first physical layer transmission channel.

2. The method of claim 1, wherein the first broadcast service is further associated with a second service component, each of the first and second service components being mapped to a different one of the plurality of physical layer transmission channels and wherein the method further comprises:
   determining a second physical layer transmission channel to which the second service component is mapped using the service association table; and
   accessing the second service component for the first broadcast service through the second physical layer transmission channel.

3. The method of claim 2, further comprising determining that the first service component and the second service component correspond to different layers of a scalable video codec.

4. The method of claim 2, further comprising applying a first error correction function to the first service component and a second error correction function different from the first error correct function to the second service component.

5. The method of claim 1, wherein the broadcast signal comprises a second broadcast service sharing the first service component with the first broadcast service and wherein the method further comprises:
   identifying, based on the service association table, that the second broadcast service is associated with the first service component;
   determining that the first service component is mapped to the first physical layer transmission channel using the service association table; and
   accessing the first service component for the second broadcast service through the first physical layer transmission channel.

6. The method of claim 1, further comprising:
   determining that the first broadcast service includes a plurality of service components; and
   determining one or more service components of the plurality of service components to access based on a receiver capability.

7. The method of claim 1, wherein the first physical layer transmission channel corresponds to a plurality of broadcast frames in a transmission stream.

8. The method of claim 7, wherein the first physical layer transmission channel is further defined by a set of transmission slices in the plurality of broadcast frames.

9. The method of claim 1, wherein the one or more buffer parameters comprise a buffer size parameter indicating a required memory for buffering a frame of the first broadcast service or a time parameter indicating a maximum allowed time to consume the buffered frame.

10. One or more non-transitory computer readable media storing computer readable instructions that, when executed, cause an apparatus to:
   receive a broadcast signal comprising a first broadcast service associated with a first service component;
   receive a service association table that includes associations between the first broadcast service and a plurality of physical layer transmission channels that are configured to carry the first broadcast service;
   identify, based on the service association table, the plurality of physical layer transmission channels that are associated with the first broadcast service;
   determine a first physical layer transmission channel carrying the first service component from the plurality of physical layer transmission channels;
   determine, from the service association table, one or more buffer parameters for the first broadcast service; and
   access the first service component for the first broadcast service through the first physical layer transmission channel.

11. The one or more non-transitory computer readable media of claim 10, wherein the first broadcast service is further associated with a second service component, each of the first and second service components being mapped to a different one of the plurality of physical layer transmission channels and wherein the computer readable instructions, when executed, further cause the apparatus to:
   determine a second physical layer transmission channel to which the second service component is mapped using the service association table; and
   access the second service component for the first broadcast service through the second physical layer transmission channel.

12. The one or more non-transitory computer readable media of claim 11, wherein the computer readable instructions, when executed, further cause the apparatus to determine that the first service component and the second service component correspond to different layers of a scalable video codec.

13. The one or more non-transitory computer readable media of claim 11, wherein the computer readable instructions, when executed, further cause the apparatus to apply a first error correction function to the first service component and a second error correction function different from the first error correct function to the second service component.

14. The one or more non-transitory computer readable media of claim 10, wherein the broadcast signal comprises a second broadcast service sharing the first service component with the first broadcast service and wherein the computer readable instructions, when executed, further cause the apparatus to:
   identify, based on the service association table, that the second broadcast service is associated with the first service component;
   determine that the first service component is mapped to the first physical layer transmission channel using the service association table; and
   access the first service component for the second broadcast service through the first physical layer transmission channel.

15. The one or more non-transitory computer readable media of claim 10, wherein the computer readable instructions, when executed, further cause the apparatus to:
   determine that the first broadcast service includes a plurality of service components; and
   determine one or more service components of the plurality of service components to access based on a receiver capability.

16. The one or more non-transitory computer readable media of claim 10, wherein accessing the first service component includes receiving the first service component.

17. An apparatus comprising:
   a processor; and
   memory storing computer readable instructions that, when executed, cause the apparatus to:
      receive a broadcast signal comprising a first broadcast service associated with a first service component;
      receive a service association table that includes associations between the first broadcast service and a plurality of physical layer transmission channels that are configured to carry the first broadcast service;
      identify, based on the service association able, the plurality of physical layer transmission channels that are associated with the first broadcast service;
      determine a first physical layer transmission channel carrying the first service component from the plurality of physical layer transmission channels;
      determine, from the service association table, one or more buffer parameters for the first broadcast service; and
      access the first service component for the first broadcast service through the first physical layer transmission channel.

18. The apparatus of claim 17, wherein the first broadcast service is further associated with a second service component, each of the first and second service components being mapped to a different one of the plurality of physical layer transmission channels and wherein the computer readable instructions, when executed, further cause the apparatus to:
   determine a second physical layer transmission channel to which the second service component is mapped using the service association table; and
   access the second service component for the first broadcast service through the second physical layer transmission channel.

19. The apparatus of claim 18, wherein the computer readable instructions, when executed, further cause the apparatus to determine that the first service component and the second service component correspond to different layers of a scalable video codec.

20. The apparatus of claim 18, wherein the computer readable instructions, when executed, further cause the apparatus to apply a first error correction function to the first service component and a second error correction function different from the first error correct function to the second service component.

21. An apparatus comprising:
   a processor; and
   memory storing computer readable instructions that, when executed, cause the apparatus to:
      identify a first service component and a second service component associated with a broadcast service;
      generate an association section that includes a first association linking the first service component with a first physical layer pipe that is transmitted in a plurality of time slices, a second association linking the second service component with a second physical layer pipe that is transmitted in the plurality of time slices, and one or more buffer parameters; wherein the one or more buffer parameters include: (a) a buffer size parameter indicating a maximum size of the plurality of time slices, or (b) a time parameter indicating an interval of time between the plurality of time slices and another plurality of time slices that include physical layer pipes linked to the first service component and the second service component; and
transmit the association section.

* * * * *